US010488612B2

(12) United States Patent
Gonzalez Covarrubias et al.

(10) Patent No.: US 10,488,612 B2
(45) Date of Patent: Nov. 26, 2019

(54) FIBER OPTIC SPOOL DRAWER WITH TRANSLATABLE AND/OR REMOVABLE DRAWER FOR DEPLOYMENT OF FIBER OPTIC CABLE

(71) Applicant: Corning Optical Communications LLC, Hickory, NC (US)

(72) Inventors: Juan Miguel Gonzalez Covarrubias, Reynosa (MX); Austin Cody Landis, Vale, NC (US); Arturo Parra Morales, Reynosa (MX); Richard David Morris, Fort Worth, TX (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/788,306

(22) Filed: Oct. 19, 2017

(65) Prior Publication Data

US 2018/0129008 A1    May 10, 2018

Related U.S. Application Data

(60) Provisional application No. 62/418,457, filed on Nov. 7, 2016.

(51) Int. Cl.
*G02B 6/44* (2006.01)
*G02B 6/38* (2006.01)

(52) U.S. Cl.
CPC ......... *G02B 6/4455* (2013.01); *G02B 6/3897* (2013.01); *G02B 6/4452* (2013.01); *G02B 6/4453* (2013.01); *G02B 6/4457* (2013.01)

(58) Field of Classification Search
CPC .. G02B 6/4455; G02B 6/3897; G02B 6/4452; G02B 6/4453; G02B 6/4457
USPC ........................................................ 385/135
See application file for complete search history.

(56) References Cited

U.S. PATENT DOCUMENTS

| 7,756,379 | B2 | 7/2010 | Kowalczyk et al. |
| 7,894,701 | B2 | 2/2011 | Kowalczyk et al. |
| 8,189,984 | B2 | 5/2012 | Kowalczyk et al. |
| 8,428,419 | B2 | 4/2013 | Leblanc et al. |
| 8,494,333 | B2 | 7/2013 | Kowalczyk et al. |
| 8,705,929 | B2 | 4/2014 | Kowalczyk et al. |
| 2005/0025444 | A1* | 2/2005 | Barnes ................... A47B 88/08 385/135 |

(Continued)

*Primary Examiner* — Jerry M Blevins
(74) *Attorney, Agent, or Firm* — Grant A. Gildehaus

(57) ABSTRACT

Embodiments of the disclosure are directed to a fiber optic spool drawer with a translatable and/or removable drawer for deployment of fiber optic cable. In exemplary aspects disclosed herein, the fiber optic spool drawer includes a housing with a translatable drawer and a rotatable spool disposed within an interior area of the housing. The translatable drawer includes a selective locking mechanism and is bidirectionally translatable within and bidirectionally removable from the housing. The rotatable spool is mounted to the translatable drawer and configured to rotate to deploy fiber optic cable. Still further, the fiber optic deployment assembly also includes front and back routing guides to manage and prevent damage to the fiber optic cables deployed. Accordingly, as an example, the fiber optic spool drawer may facilitate easy, efficient, and versatile fiber routing while preventing damage to the fiber optic cable.

12 Claims, 22 Drawing Sheets

(56) References Cited

U.S. PATENT DOCUMENTS

| | | | | |
|---|---|---|---|---|
| 2008/0142240 | A1* | 6/2008 | Mahoney | H02G 3/22 |
| | | | | 174/50 |
| 2010/0322583 | A1* | 12/2010 | Cooke | G02B 6/4452 |
| | | | | 385/135 |
| 2011/0317974 | A1* | 12/2011 | Krampotich | G02B 6/4452 |
| | | | | 385/135 |
| 2012/0219262 | A1* | 8/2012 | Hendrix | G02B 6/4452 |
| | | | | 385/135 |
| 2017/0285288 | A1* | 10/2017 | Krampotich | G02B 6/4452 |

* cited by examiner

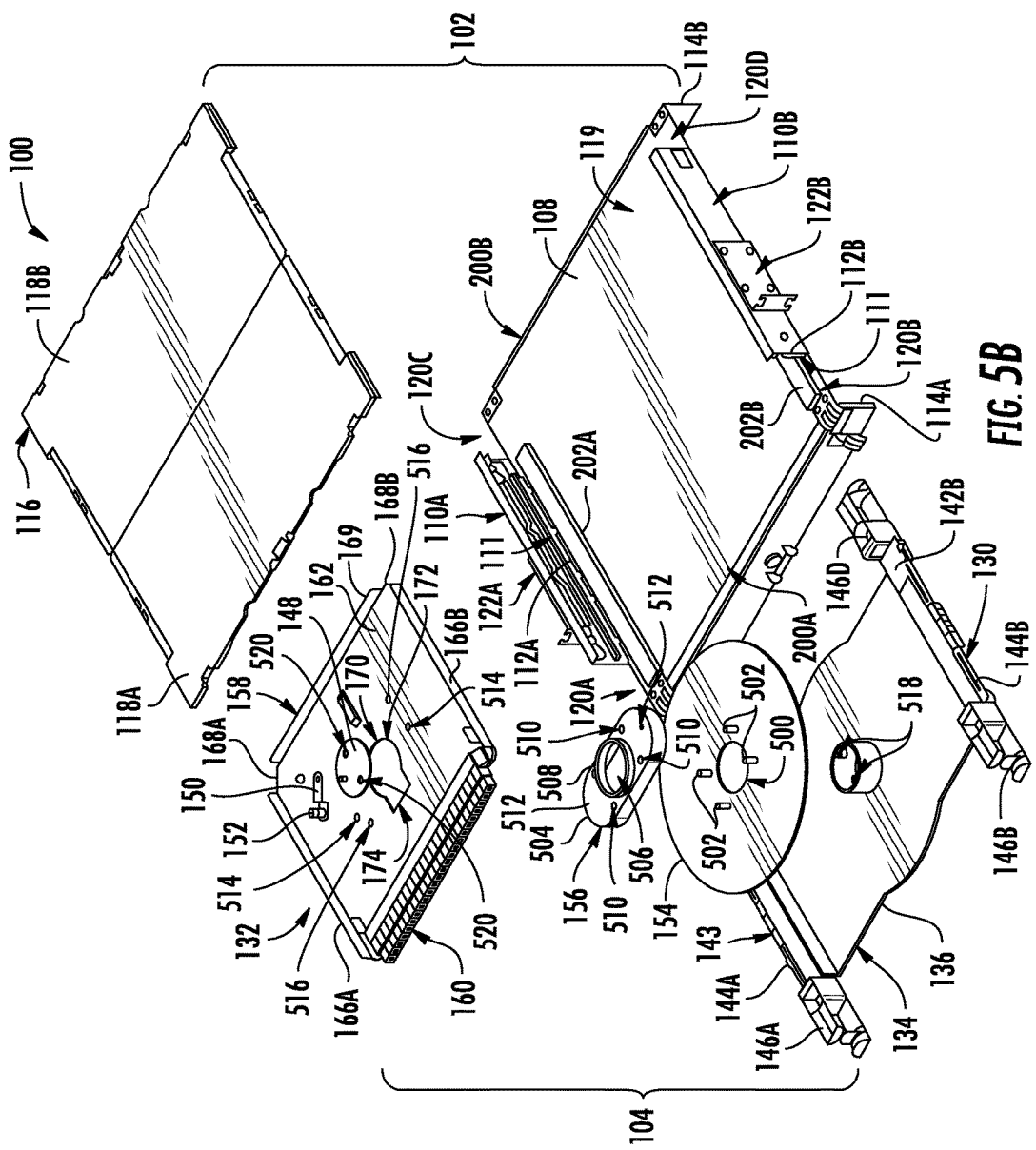

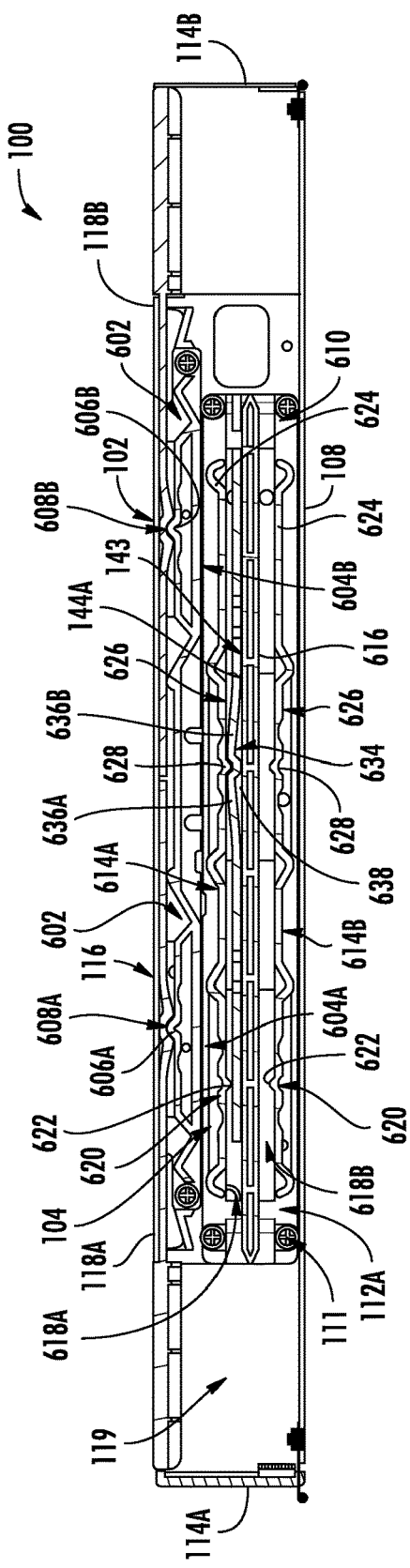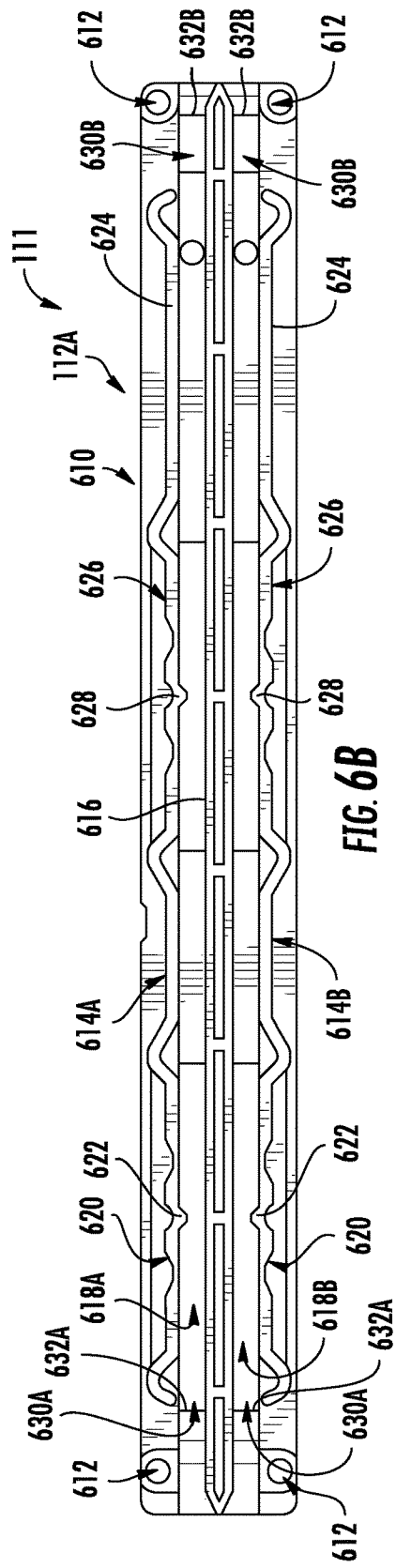

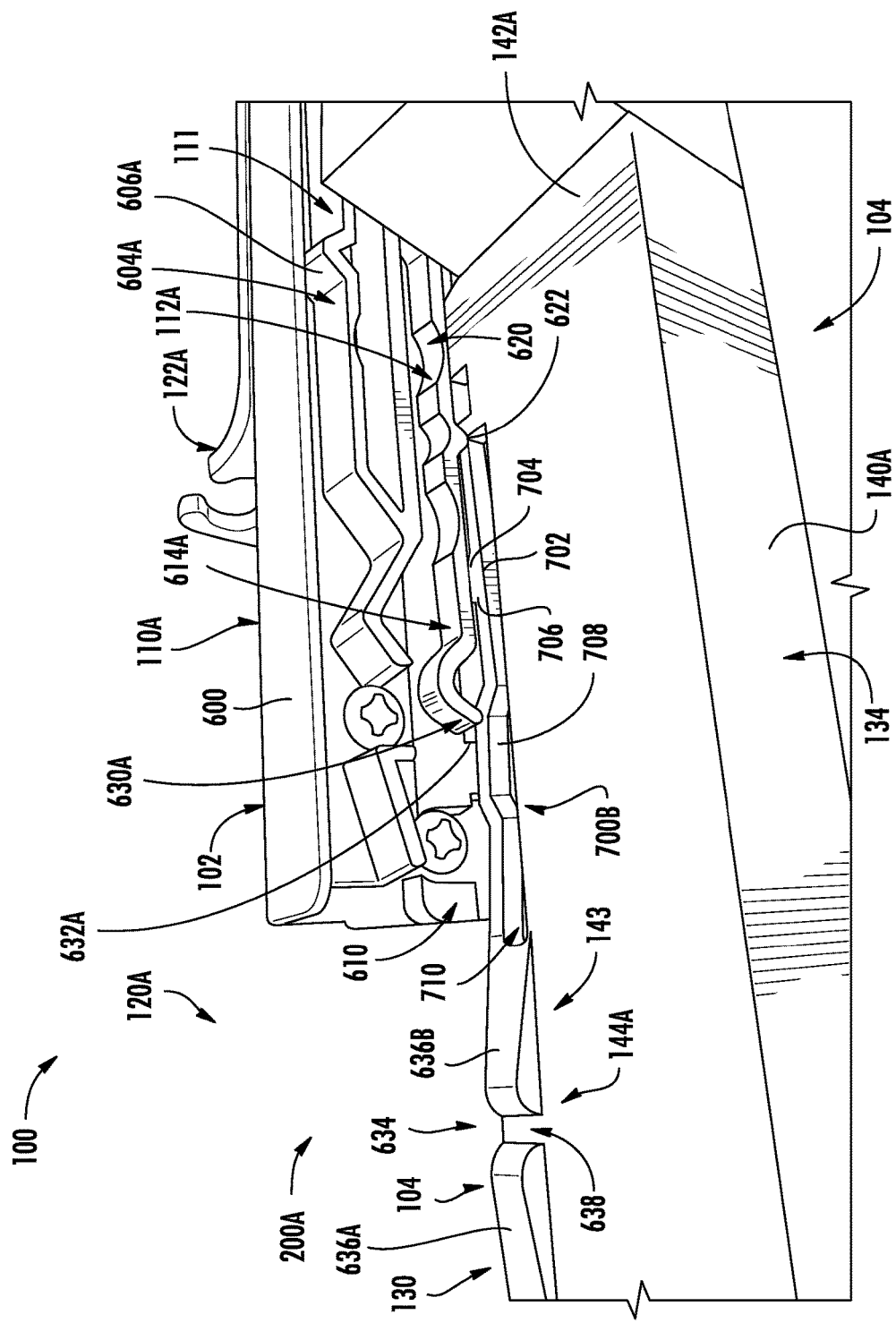

FIBER OPTIC SPOOL DRAWER WITH TRANSLATABLE AND/OR REMOVABLE DRAWER FOR DEPLOYMENT OF FIBER OPTIC CABLE

CROSS REFERENCE TO RELATED APPLICATIONS

This application claims the benefit of priority of U.S. Provisional Application Ser. No. 62/418,457, filed Nov. 7, 2016, the content of which is relied upon and incorporated herein by reference in its entirety.

BACKGROUND

The disclosure relates generally to a fiber optic spool drawer with deployable fiber optic cable housed therein, and more particularly to a fiber optic housing with a translatable and/or removable drawer for deployment of fiber optic cable.

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections. For example, the fiber optic equipment can support interconnections between servers, storage area networks (SANs), and other equipment at data centers. Interconnections may be supported by fiber optic patch panels or modules.

The fiber optic equipment is typically included in housings that are mounted in equipment racks to optimize use of space. One challenge with fiber optic housing installations relates to interconnections between fiber optic components in different housings within an installation. One common solution is the use of fiber optic cables (e.g., jumper cables), or other types of fiber optic cable interconnects, to connect components in one housing to components in another housing within the fiber optic rack or in another fiber optic rack. However, different fiber optic cables have varying lengths, which may not correspond to a desired length for a particular interconnect between components in different housings within a fiber optic installation. These fiber optic cables typically have a minimum bend radius, which should not be exceeded to prevent damage to the fiber optic cable. Further, it may be desired to route some of these different fiber optic cables from the front of the fiber optic housing, some from the back of the fiber optic housing, and/or to change the location of the fiber optic equipment on a rack after the fiber optic equipment has been connected. Accordingly, there is a need for an efficient and cost-effective system for distributing cable within a fiber optic installation while preventing damage to the fiber optic cable and which increases routing versatility.

No admission is made that any reference cited herein constitutes prior art. Applicant expressly reserves the right to challenge the accuracy and pertinency of any cited documents.

SUMMARY

Embodiments of the disclosure are directed to a fiber optic spool drawer with a translatable and/or removable drawer for deployment of fiber optic cable. In exemplary aspects disclosed herein, the fiber optic spool drawer includes a housing with a guide system disposed in an interior of the housing, as well as a translatable drawer and a rotatable spool disposed within the interior area of the housing. The translatable drawer includes a rail system with a selective locking mechanism to enable the translatable drawer to be bidirectionally translatable within (e.g., pulled out a front and back of the housing) and bidirectionally removable from (e.g., removable from the front and back of the housing) the housing. The rotatable spool is mounted to the translatable drawer and configured to rotate within and out of the housing to deploy fiber optic cable wound around the rotatable spool from a front or back of the housing. Still further, the fiber optic deployment assembly also includes front and back routing guides to manage and prevent damage to the fiber optic cables deployed out a front or back of the housing. Accordingly, as an example, the fiber optic spool drawer may facilitate easy, efficient, and versatile fiber routing while preventing damage to the fiber optic cable.

One embodiment of the disclosure relates to a fiber optic spool drawer comprising a housing, a translatable drawer, and a rotatable spool. The housing defines a front opening, a back opening, and an interior area disposed between the front opening and the back opening. The housing comprises a guide system disposed in the interior area. The translatable drawer is configured to be housed within the interior area of the housing. The translatable drawer comprises a rail system and a locking mechanism. The rail system is configured to slidably engage with the guide system to allow the translatable drawer to translate through the front opening and back opening of the housing. The locking mechanism is configured to maintain engagement of the rail system with the guide system until selective disengagement therefrom. The translatable drawer is removable through the front opening and back opening by selective disengagement of the locking mechanism from the guide system. The rotatable spool is rotatably mounted to the translatable drawer. The rotatable spool is configured to store a length of a fiber optic cable wound around the rotatable spool. The fiber optic cable is comprises a plurality of optical fibers terminated by a plurality of connectors.

An additional embodiment of the disclosure relates to a fiber optic spool drawer comprising a housing, a translatable drawer, and a rotatable spool. The housing defines a front opening, a back opening, and an interior area disposed between the front opening and the back opening. The housing comprises a guide system disposed in the interior area. The translatable drawer is configured to be housed within the interior area of the housing. The translatable drawer comprises a rail system, at least one front routing guide disposed towards a front of the translatable drawer, and at least one back routing guide disposed towards a back of the translatable drawer. The rail system is configured to slidably engage with the guide system to allow the translatable drawer to translate through the front opening and back opening of the housing. The rotatable spool is rotatably mounted to the translatable drawer, the rotatable spool configured to store a length of a fiber optic cable wound around the rotatable spool. The fiber optic cable comprises a plurality of optical fibers terminated by a plurality of connectors. The at least one front routing guide is configured to receive at least a portion of the fiber optic cable therethrough to maintain a minimum bend radius of the fiber optic cable when the fiber optic cable is deployed from a front of the housing. The at least one back routing guide is configured to receive at least a portion of the fiber optic cable therethrough to maintain the minimum bend radius of the fiber optic cable when the fiber optic cable is deployed from a back of the housing.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 5B is a perspective exploded view of the fiber optic spool drawer of FIGS. 1A-5A;

FIG. 6A is a cross-sectional side view of the fiber optic housing of FIG. 1A illustrating engagement of the translatable drawer with a left rail guide of the fiber optic housing;

FIG. 6B is a side view of the left rail guide of FIG. 6A;

FIG. 7D is a perspective view of the fiber optic spool drawer of FIG. 7A illustrating a back engagement mechanism of the right rail of the translatable drawer interacting with the left rail guide as the translatable drawer is translated out the front opening of the fiber optic housing;

DETAILED DESCRIPTION

Embodiments of the disclosure are directed to a fiber optic spool drawer with a translatable and/or removable drawer for deployment of fiber optic cable. In exemplary aspects disclosed herein, the fiber optic spool drawer includes a housing with a guide system disposed in an interior of the housing, as well as a translatable drawer and a rotatable spool disposed within the interior area of the housing. The translatable drawer includes a rail system with a selective locking mechanism to enable the translatable drawer to be bidirectionally translatable within (e.g., pulled out a front and back of the housing) and bidirectionally removable from (e.g., removable from the front and back of the housing) the housing. The rotatable spool is mounted to the translatable drawer and configured to rotate within and out of the housing to deploy fiber optic cable wound around the rotatable spool from a front or back of the housing. Still further, the fiber optic deployment assembly also includes front and back routing guides to manage and prevent damage to the fiber optic cables deployed out a front or back of the housing. Accordingly, as an example, the fiber optic spool drawer may facilitate easy, efficient, and versatile fiber routing while preventing damage to the fiber optic cable.

The fiber optic spool drawer may provide a user with easier access to the interior of the housing, including the fiber optic cable, and can facilitate fiber routing. For example a fiber optic cable wound around the rotatable spool, can be withdrawn from or retracted into the fiber optic spool drawer without disconnecting the fiber optic cable from fiber optic adapters contained within the fiber optic spool drawer, and without requiring additional jumpers of different lengths. Accordingly, the fiber optic spool drawer facilitates easy and efficient routing by allowing fiber optic cables to be routed from a front or back of the fiber optic housing, and/or allowing a user to remove the fiber optic deployment assembly, such as to change the location of the fiber optic deployment assembly on a rack after the fiber optic cable has been connected.

Figure 1A:
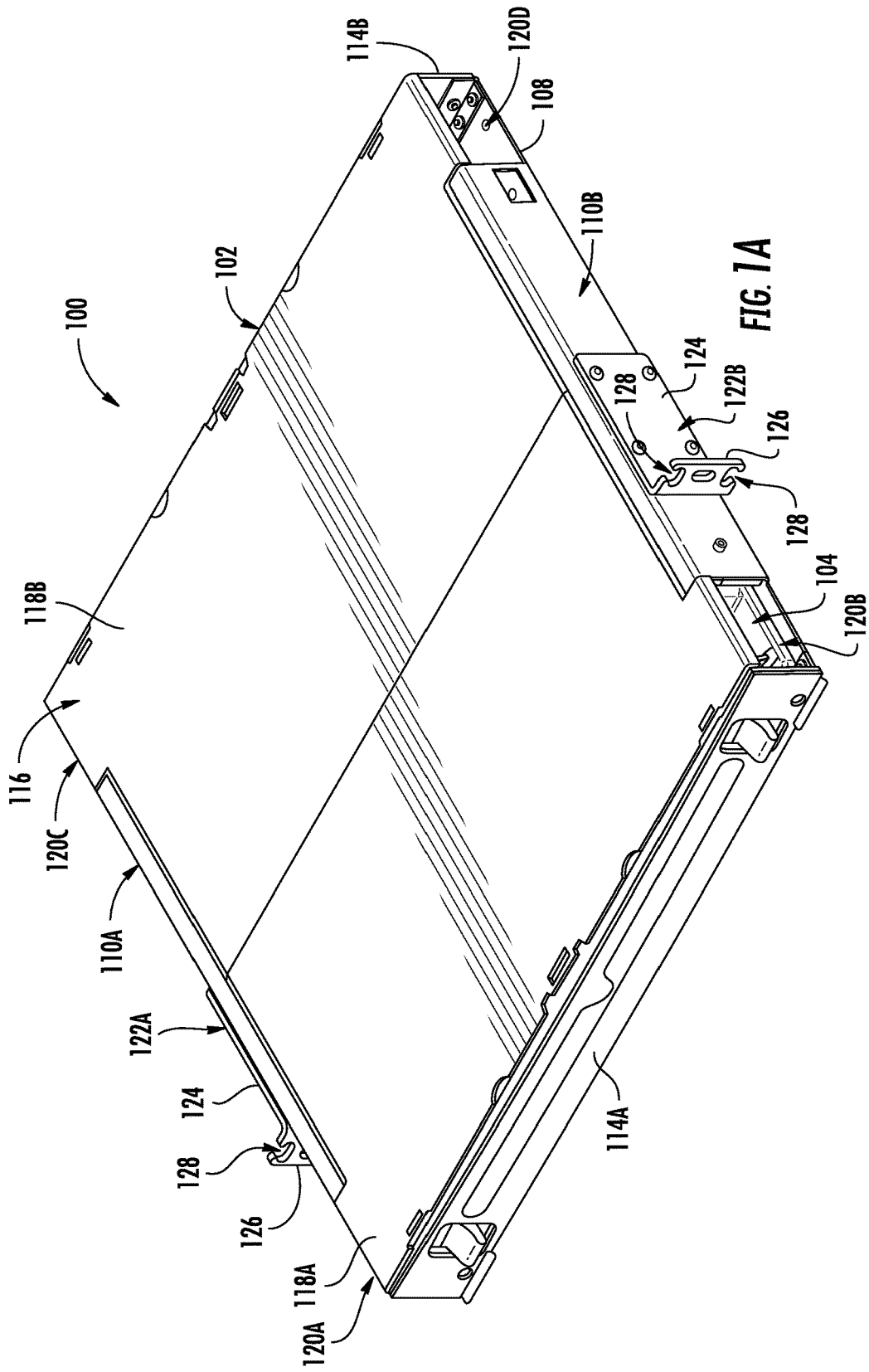
FIG. 1A is a front perspective view of a fiber optic spool drawer according to one embodiment of the present disclosure, the fiber optic spool drawer comprising a fiber optic housing with a top cover, the fiber optic housing enclosing a fiber optic deployment assembly removable from a front or back of the housing, the fiber optic deployment assembly in a retracted position within the fiber optic housing.
Figure 1B:
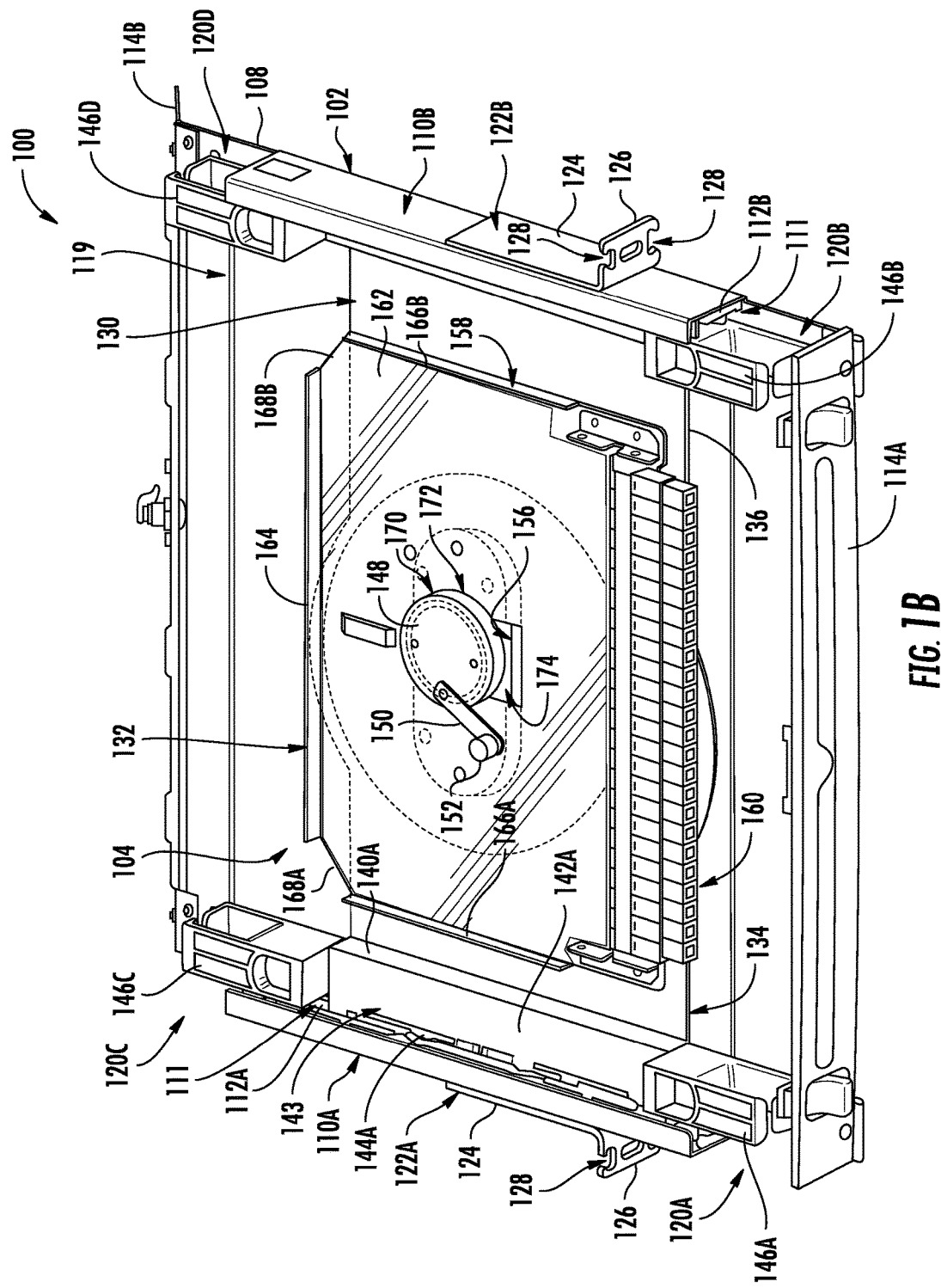
FIG. 1B is a front perspective view of the fiber optic spool drawer of FIG. 1A with the top cover of the fiber optic housing removed, the fiber optic deployment assembly comprising a translatable drawer and a rotating spool rotatably mounted to the translatable drawer.
Figure 1C:
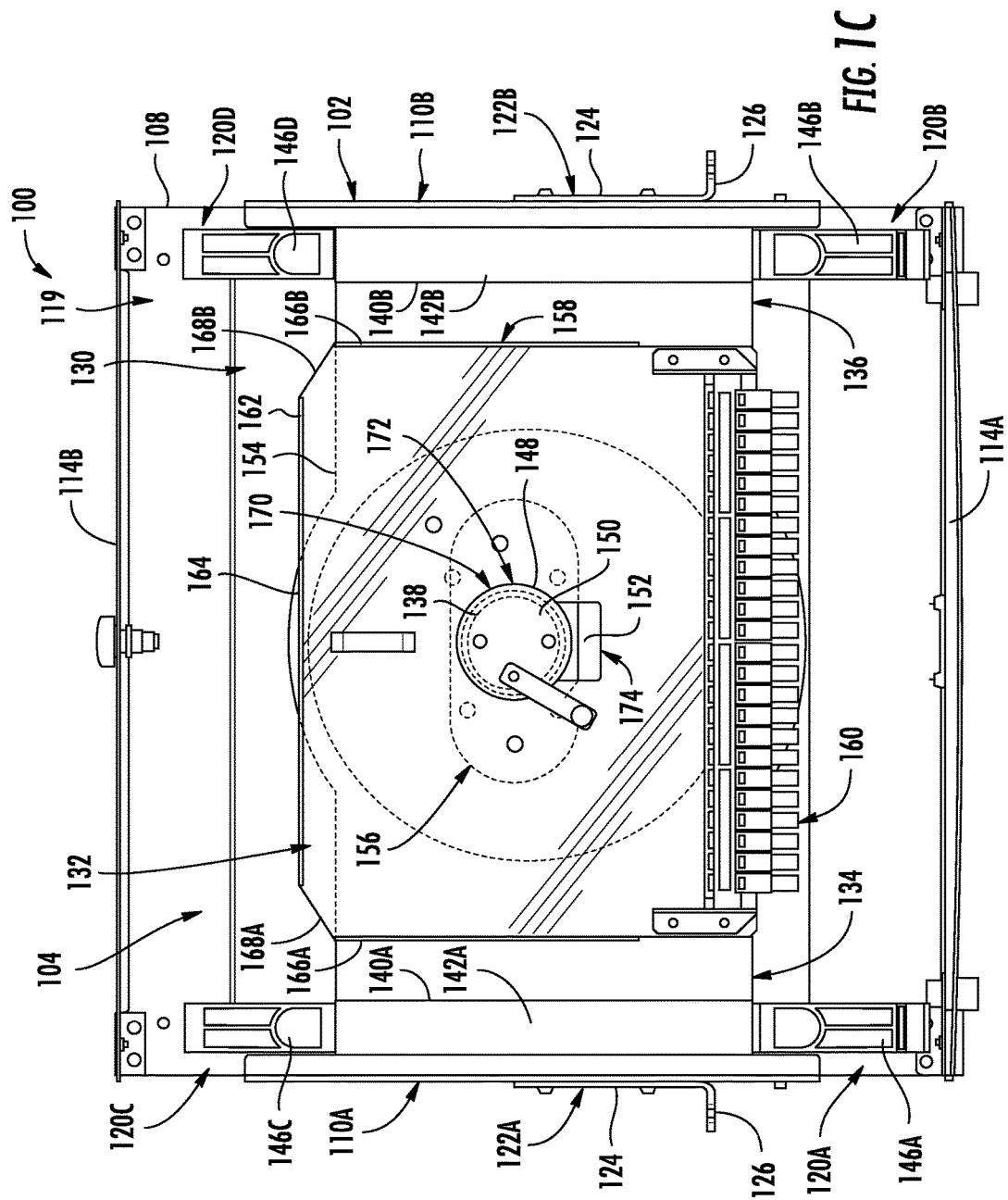
FIG. 1C is a top view of the fiber optic spool drawer of FIG. 1B.
Figure 1D:
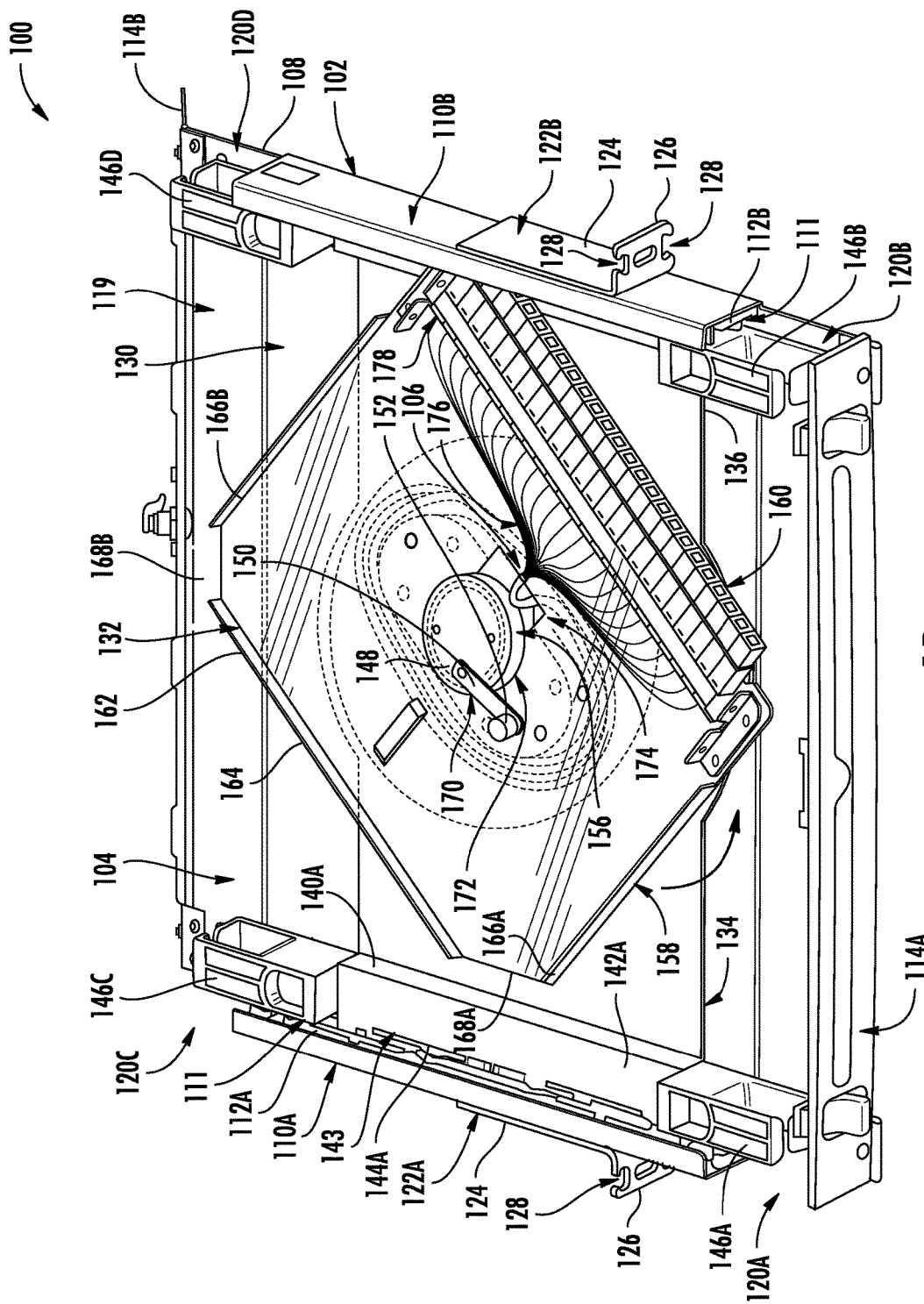
FIG. 1D is a front perspective view of the fiber optic spool drawer of FIG. 1B comprising a fiber optic cable, the rotatable spool partially rotated relative to the translatable drawer.

FIGS. 1A-1D are views of a fiber optic spool drawer 100 comprising a fiber optic housing 102 and a fiber optic deployment assembly 104 in a retracted position within the fiber optic housing 102, the fiber optic deployment assembly 104 carrying fiber optic cable 106 (not shown). FIG. 1A is a front perspective view of a fiber optic spool drawer 100, FIG. 1B is a front perspective view of an interior of the fiber optic spool drawer 100, FIG. 1C is a top view of the interior of the fiber optic spool drawer 100, and FIG. 1D is a front perspective view of the fiber optic spool drawer 100 with the fiber optic cable 106, as well as the fiber optic deployment assembly 104 partially rotated. The fiber optic cable 106 is deployable from a front and back of the fiber optic housing 102, which facilitates fiber routing versatility. Further the fiber optic cable could have any of a number of fibers (e.g., 12 fiber, 24 fiber, 36 fiber, etc.), and could be of any suitable length (e.g., 100 ft., 200 ft., etc.), depending on the needs and requirements of the user.

Figure 4A:
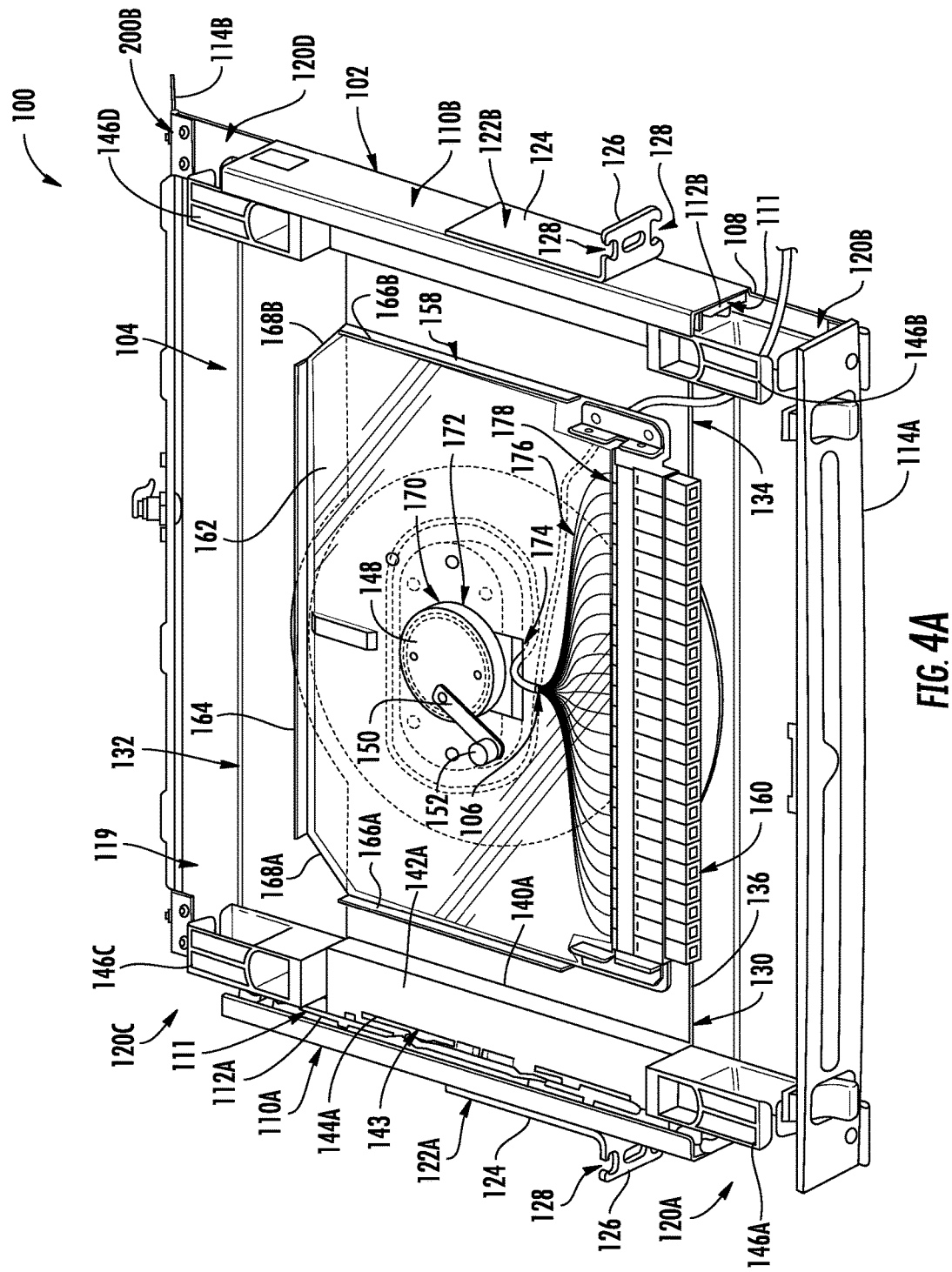
FIG. 4A is a top perspective view of the fiber optic spool drawer of FIGS. 1A-3C illustrating the fiber optic cable deployed through a front routing guide when the front hinged door of the fiber optic housing is closed, the front routing guide maintaining a minimum bend radius of the fiber optic cable.
Figure 4B:
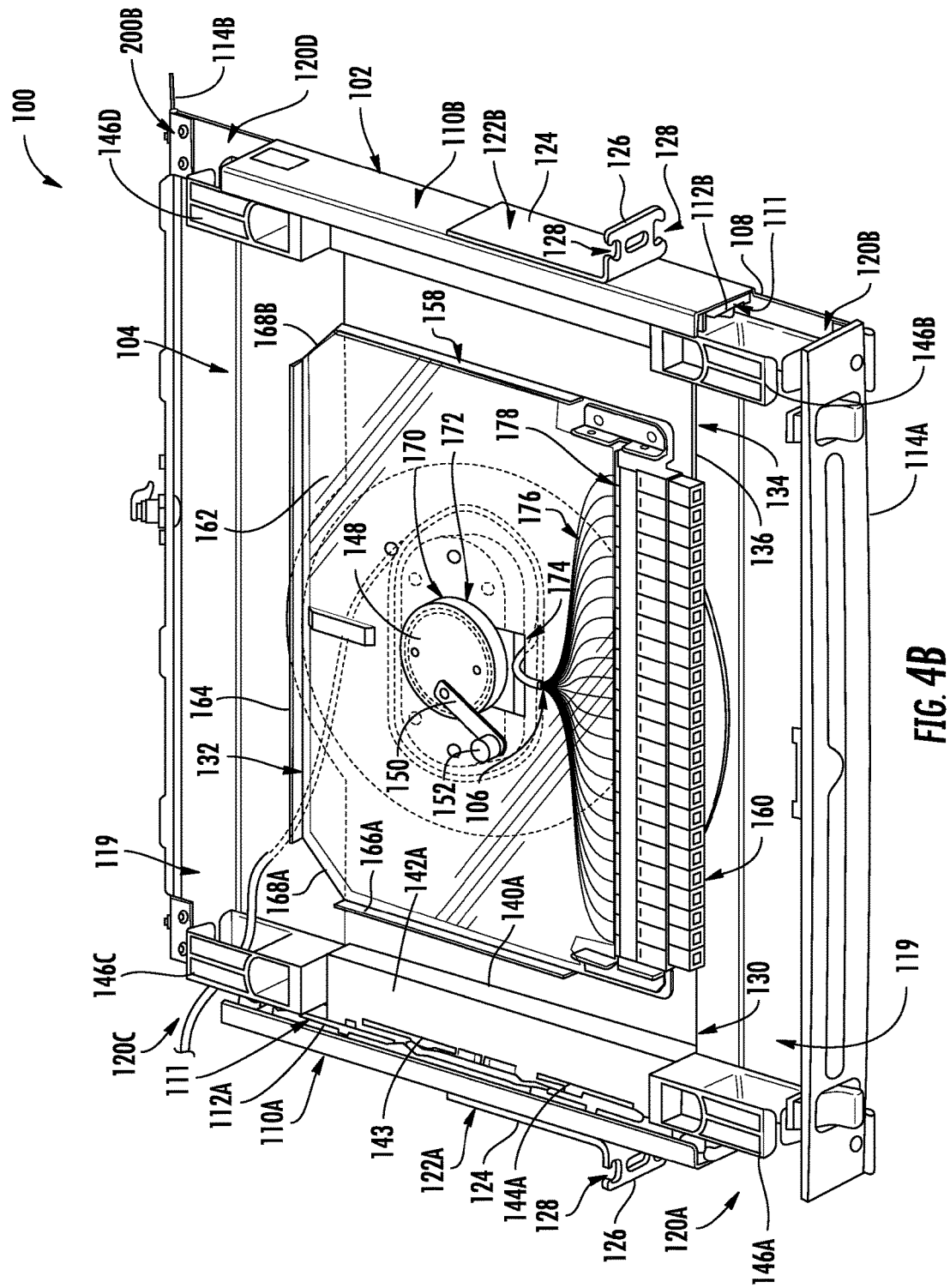
FIG. 4B is a top perspective view of the fiber optic spool drawer of FIGS. 1A-3C illustrating the fiber optic cable deployed through a back routing guide when the front hinged door of the fiber optic housing is closed, the back routing guide maintaining a minimum bend radius of the fiber optic cable.

In certain embodiments (not shown), the fiber optic spool drawer 100 comprises a plurality of fiber optic deployment assemblies 104 (e.g., U space fiber optic equipment units). In certain embodiments, the fiber optic deployment assembly 104 is configured to support a given fiber optic connection density or bandwidth in a 1-U space, and for a given fiber optic component type. In this embodiment, the fiber optic housing 102 is 1-U in size; however, the fiber optic housing 102 could be provided in a size greater than 1-U as well (e.g., 2-U space, 4-U space, etc.). In certain embodiments, "U" is equal to a standard 1.75 inches in height and nineteen inches in width. In certain applications, the width of "U" may be twenty-three inches. As explained below, the fiber optic spool drawer 100 can facilitate easy and efficient routing by allowing fiber optic cable 106 to be routed from a front and/or back of the fiber optic housing 102 (e.g., as shown in FIGS. 4A-4B), and/or allowing a user to remove the fiber optic deployment assembly 104 (e.g., as shown in FIGS. 7A-7F), such as to change the location of the fiber optic deployment assembly 104 on a rack after the fiber optic cable 106 has been connected. The fiber optic spool drawer 100 facilitates fiber routing while preventing damage to the fiber optic cable 106 and increasing routing versatility.

Referring to FIGS. 1A and 1B, the fiber optic housing 102 comprises a base 108 with a left sidewall 110A vertically extending from a left edge of the base 108, and a right sidewall 110B vertically extending from a right edge of the base 108 (opposite the left sidewall 110A). The left and right sidewalls 110A, 110B have a length less than the left and right edges of the base 108 in this example to at least partially define apertures for deployment of fiber optic cable 106, which is explained below in more detail. The fiber optic housing 102 further comprises a guide system 111 to provide translation of the fiber optic deployment assembly 104 relative to the fiber optic housing 102. The guide system 111 comprises left and right rail guides 112A, 112B mounted to an interior surface of the left and right sidewalls 110A, 110B. The left and right rail guides 112A, 112B are configured to engage the fiber optic deployment assembly 104 to provide translation of the fiber optic deployment assembly 104 relative to the fiber optic housing 102 (discussed in more detail below).

The fiber optic housing 102 further comprises a front hinged door 114A hingedly connected to a front edge of the base 108, and a back hinged door 114B hingedly connected to a back edge of the base 108, providing selective access and enclosing the fiber optic deployment assembly 104 within the fiber optic housing 102. The front and back hinged doors 114A, 114B extend from a left edge of the base 108 to a right edge of the base 108. As shown, the front and back hinged doors 114A, 114B are in a closed position (e.g., vertically oriented upward relative to the base 108). The fiber optic housing 102 further comprises a top cover 116 comprising a front panel 118A and a back panel 118B to enclose the fiber optic deployment assembly 104 within the fiber optic housing 102. The front panel 118A and back panel 118B may be unattached to one another, hingedly attached to one another, or integrally (e.g., fixedly) attached to one another. The top cover 116 is positioned above the base 108 at (or proximate to) a top of the left and right sidewalls 110A, 110B. The base 108, left and right sidewalls 110A, 110B, front and back hinged doors 114A, 114B, and top cover 116 define an interior area 119. The fiber optic deployment assembly 104 (and components thereof) is translatable and/or rotatable within the interior area 119 of the fiber optic housing 102, as discussed below.

The fiber optic housing 102, front hinged door 114A, and back hinged door 114B further define a plurality of side apertures 120A, 120B, 120C, 120D when the front hinged door 114A and back hinged door 114B are in the closed position so that the fiber optic cable 106 can exit the fiber optic housing 102 when the front hinged door 114A and back hinged door 114B are in the closed position. More specifically, a front left side aperture 120A is defined between the base 108, a front edge of the left sidewall 110A, and a left edge of the front hinged door 114A. A front right side aperture 120B is defined between the base 108, a front edge of the right sidewall 110B, and a right edge of the front hinged door 114A. A back left side aperture 120C is defined between the base 108, a back edge of the left sidewall 110A, and a left edge of the back hinged door 114B. A back right side aperture 120D is defined between the base 108, a back edge of the right sidewall 110B, and a right edge of the back hinged door 114B.

The fiber optic housing 102 further comprises a left mounting bracket 122A attached to an exterior surface of the left sidewall 110A, and a right mounting bracket 122B attached to an exterior surface of the right sidewall 110B to mount the fiber optic housing 102 (e.g., to a rack). More specifically, each of the left and right mounting brackets 122A, 122B comprises a first portion 124 (e.g., providing an attachment surface to the fiber optic housing 102) and a second portion 126 perpendicular to the first portion 124 (e.g., providing a mounting surface to a rack). The first portion 124 of each of the left and right mounting brackets 122A, 122B is attached, respectively, to the exterior surface of the left and right sidewalls 110A, 110B. The second portion 126 of each of the left and right mounting brackets 122A, 122B extends perpendicularly from the left and right sidewalls 110A, 110B, respectively, and is vertically oriented. The second portion 126 comprises two slots 128, each with an open end at an edge of the second portion 126 for mounting. More specifically, the second portion 126 comprises two slots 128 at opposite ends of the second portion 126 such that the left and right mounting brackets 122A, 122B comprise a top slot (e.g., open top slot) and a bottom slot (e.g., open bottom slot) when mounted to the left and right sidewalls 110A, 110B. These slots 128 facilitate mounting of the fiber optic housing 102 to a rack (or any other structure) by allowing a user to position one or more fasteners (e.g., screws) in the rack, and then position the left and/or right mounting brackets 122A, 122B of the fiber optic housing 102 about the one or more prepositioned fasteners (e.g., through the open end of the slot 128), thereby aligning any remaining slots 128 with their respective holes in the rack. This is compared to having to align all the slots 128 with the rack, and then inserting the fasteners.

Referring to FIGS. 1B-1C, the fiber optic deployment assembly 104 comprises a translatable drawer 130 and a rotatable spool 132 mounted to the translatable drawer 130 and configured to rotate within the fiber optic housing 102. The translatable drawer 130 translates the fiber optic deployment assembly 104 relative to the fiber optic housing 102, and the rotatable spool 132 rotates (e.g., within the fiber optic housing 102) relative to the fiber optic housing 102 to alter a length of the fiber optic cable 106. The fiber optic cable 106, wound around the rotatable spool 132, can be withdrawn from or retracted into the fiber optic spool drawer 100 without disconnecting the fiber optic cable 106 from fiber optic adapters (discussed below) contained within the fiber optic spool drawer 100, and without requiring additional jumpers of different lengths.

The translatable drawer 130 comprises a sliding tray 134, which comprises a base 136 and a mounting cylinder 138 extending upwardly from the base 136 to provide a point of attachment and rotation of the rotatable spool 132 relative to the translatable drawer 130. The mounting cylinder 138 could be fully or partially hollow (discussed in more detail below). The sliding tray 134 further comprises a left vertical wall 140A extending from a left edge of the base 136 and a right vertical wall 140B extending from a right edge of the base 136 (the right vertical wall 140B opposite the left vertical wall 140A). The left and right vertical walls 140A, 140B help stabilize the sliding tray 134 against left and right tray stabilizing rails (discussed below) during translation and/or during rotation of the rotatable spool 132 (discussed below), among other things. The sliding tray 134 further comprises a left upper horizontal wall 142A extending from an upper edge of the left vertical wall 140A, and a right upper horizontal wall 142B extending from an upper edge of the right vertical wall 140B. The left and right upper horizontal walls 142A, 142B extend away from each other (e.g., away from a center of the base 136) to extend over the left and right tray stabilizing rails (discussed below). The sliding tray 134 further comprises a rail system 143 comprising a left engagement rail 144A along an edge of the left upper horizontal wall 142A (opposite from the left vertical wall 140A), and a right engagement rail 144B (not shown) along an edge of the right upper horizontal wall 142B (opposite from the right vertical wall 140B). The left and right engagement rails 144A, 144B are configured to engage the left and right rail guides 112A, 112B (discussed in more detail below), thereby providing translation and/or removal of the fiber optic deployment assembly 104 relative to the fiber optic housing 102. This provides a user easier access to the fiber optic deployment assembly 104 and fiber optic cable 106, and can facilitate fiber routing.

The translatable drawer 130 further comprises a left and right front routing guides 146A, 146B at a front of the sliding tray 134, and left and right back routing guides 146C, 146D at a back of the sliding tray 134. The routing guides 146A, 146B, 146C, 146D receive at least a portion of deployed fiber optic cable 106 therein to manage and prevent damage to the fiber optic cable 106 deployed out a front or back of the fiber optic housing 102 (e.g., does not exceed a minimum bend radius). More specifically, a left front routing guide 146A is mounted to the sliding tray 134 at or proximate a front edge of the left vertical wall 140A and/or left upper horizontal wall 142A. A right front routing guide 146B is mounted to the sliding tray 134 at or proximate a front edge of the right vertical wall 140B and/or right upper horizontal wall 142B. A left back routing guide 146C is mounted to the sliding tray 134 at or proximate a back edge of the left vertical wall 140A and/or left upper horizontal wall 142A. A right back routing guide 146D is mounted to the sliding tray 134 at or proximate a back edge of the right vertical wall 140B and/or right upper horizontal wall 142B. The routing guides 146A, 146B, 146C, 146D are configured to receive therein at least a portion of the fiber optic cable 106 and are positioned on the sliding tray 134 to be proximate the side apertures 120A, 120B, 120C, 120D when the fiber optic deployment assembly 104 is in the retained position relative to the fiber optic housing 102 (explained in more detail below).

The translatable drawer 130 further comprises a cover 148 attached to a top of the sliding tray mounting cylinder 138. The diameter of the cover 148 is greater than the diameter of the mounting cylinder 138 to retain the rotatable spool 132 therebetween (explained in more detail below). The translatable drawer 130 further comprises a rotatable arm 150 having a first end rotatably attached to the cover 148. The second end of the rotatable arm 150 comprises a locking mechanism 152 (e.g., a screw, pin, etc.) to lock the rotatable spool 132 relative to the translatable drawer 130 (explained below in more detail).

The rotatable spool 132 is configured to wrap and unwrap the fiber optic cable 106. The rotatable spool 132 comprises a base disc 154, a spindle 156, a rotating tray 158, and a plurality of fiber optic adapters 160 (e.g., a fiber optic adapter panel) mounted to the rotating tray 158 (e.g., by brackets) at and along a front edge thereof. The base disc 154 has a diameter corresponding to (e.g., equal or less than) the length of the sliding tray base 136 (e.g., from a front to a back of the sliding tray base 136). The rotating tray 158 is mounted to the base disc 154 by the spindle 156 positioned therebetween (discussed in more detail below). Together the base disc 154, spindle 156, and rotating tray 158 are configured to allow a fiber optic cable 106 to wrap and unwrap around the spindle 156, while be secured between the base disc 154 and the rotating tray 158 (discussed in more detail below).

The rotating tray comprises a base 162, a back sidewall 164 extending vertically upward from the base 162 along a back edge of the base 162, a left sidewall 166A extending vertically upward from the base 162 along a left edge of the base 162, and a right sidewall 166B extending vertically upward from the base 162 along a right edge of the base 162. The rotating tray 158 further comprises a left angled corner 168A (e.g., between the left sidewall 166A and the back sidewall 164) and a right angled corner 168B (e.g., between the right sidewall 166B and the back sidewall 164). The left and right angled corners 168A, 168B provide clearance for the rotating tray 158 to rotate relative to the fiber optic housing 102 and translatable drawer 130. The rotating tray 158 further comprises a center aperture 170 comprising a mounting portion 172 and a cable clearance portion 174 positioned towards a front of the rotating tray 158 relative to the mounting portion 172 (e.g., the cable clearance portion 174 positioned between the mounting portion 172 and the plurality of fiber optic adapters 160). The cable clearance portion 174 allows one end of the fiber optic cable 106 wound around the spindle 156 to extend to the plurality of fiber optic adapters 160 mounted to a top surface of the rotating tray 158. The rotating tray 158 (and/or top cover 116) could be transparent or at least partially translucent so that a user can see the fiber optic cable 106 positioned underneath (e.g., to see how much fiber optic cable 106 remains within the fiber optic spool drawer 100).

Referring to FIG. 1D, the fiber optic cable 106 is wound around the rotatable spool 132. More specifically, the fiber optic cable 106 is wound around the spindle 156 and positioned (and retained between) the base disc 154 and rotating tray 158. The fiber optic cable 106 comprises a plurality of optical fibers 176. One end of the fiber optic cable 106 comprises a plurality of fiber optic connectors 178, each fiber optic connector 178 connected to one of the plurality of optical fibers 176. The second end of the fiber optic cable 106 is deployed through a front of the fiber optic housing 102.

As shown, the rotatable spool 132 rotates relative to the fiber optic housing 102 and the translatable drawer 130. The rotating tray left and right angled corners 168A, 168B provide clearance between the fiber optic housing left and right sidewalls 110A, 110B. When the rotatable spool 132 rotates in a first direction, the fiber optic cable 106 unwinds from the spindle 156 and is deployed from the fiber optic housing 102. When the rotatable spool 132 rotates in a second direction (opposite the first direction), the fiber optic cable 106 winds around the spindle 156 and the fiber optic cable 106 is retracted back into the fiber optic housing 102. As the rotatable spool 132 rotates, the base disc 154 and the rotating tray 158 guide and retain the fiber optic cable 106 therebetween. The large diameter of the base disc 154 decreases the force to wind and unwind the fiber optic cable 106 by providing a large surface area to spread out frictional force between the base disc 154 and the fiber optic housing base 108. Further, as shown, when the rotatable spool 132 rotates the fiber optic connectors 178 maintain connection with the fiber optic adapters 160.

The fiber optic housing 102 and fiber optic deployment assembly 104 support high-density fiber optic equipment and a fiber optic connection density and bandwidth connections in a given space, including in a 1-U space. In this regard, the fiber optic adapters 160 can be provided such that at least twenty-four simplex or twelve duplex fiber optic connectors 178 can be disposed across of the width of the front side or face of the fiber optic deployment assembly 104, as an example, without interfering with the rotation of the rotatable spool 132 within the interior volume of the fiber optic housing 102. In another embodiment, if multi-fiber optic components were installed in the fiber optic adapters 160, such as MPO components for example, higher fiber optic connection density and bandwidths would be possible using a fiber optic housing 102 of similar dimensions. For example, if up to ten twelve fiber MPO fiber optic components were disposed in fiber optic adapters 160, and one fiber optic translatable drawer 130 was included in a fiber optic housing 102 occupying a 1-U space, the fiber optic housing 102 would support up to one hundred-twenty fiber optic connections in a 1-U space. If up to ten twenty-four fiber MPO fiber optic components were disposed in fiber optic adapter, and one fiber optic deployment assembly 104 was included in a fiber optic housing 102 occupying a 1-U space, the fiber optic housing 102 would support up to two hundred forty fiber optic connections in a 1-U space.

Figure 2A:
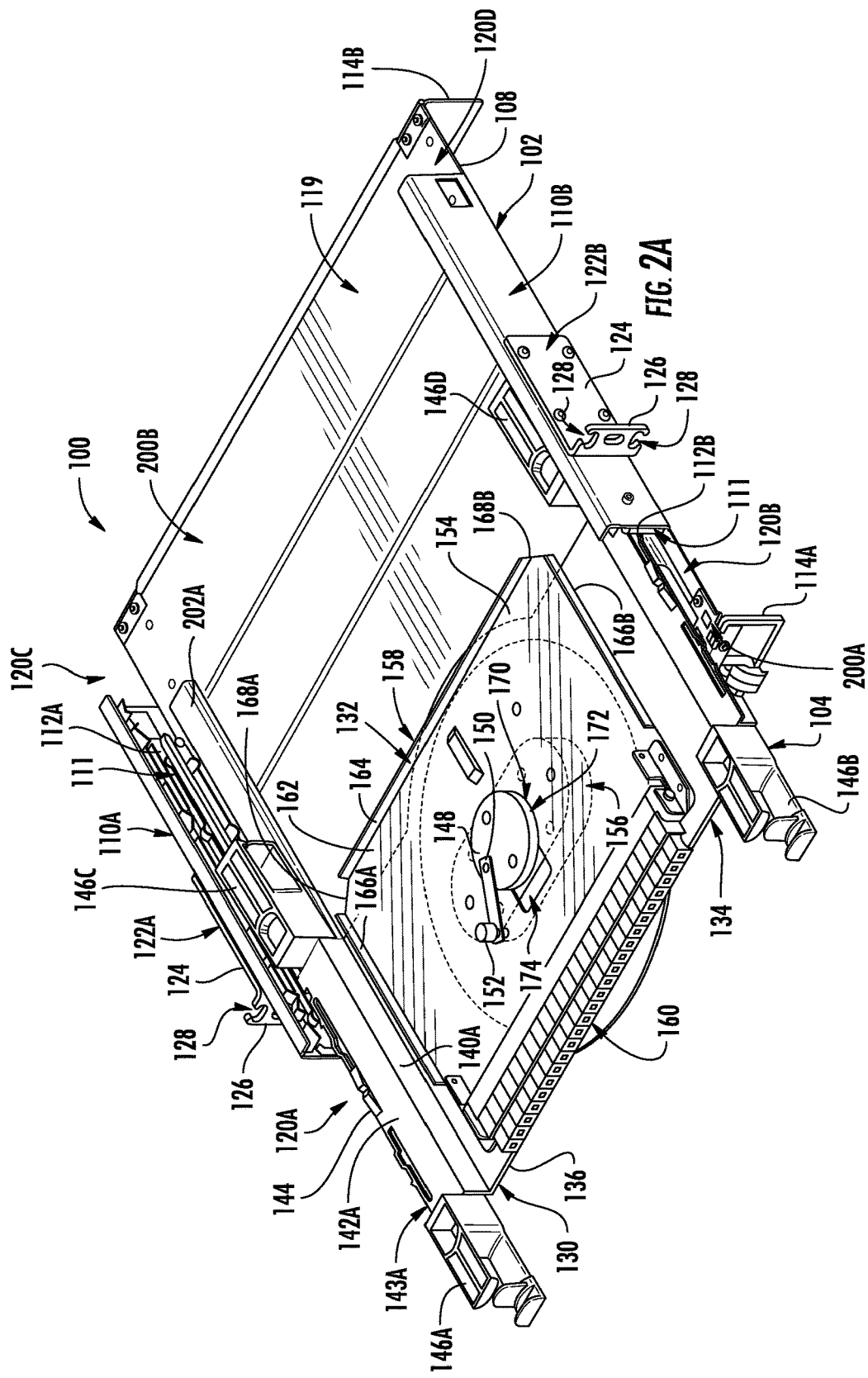
FIG. 2A is a front perspective view of the fiber optic spool drawer of FIGS. 1A-1D with the top cover removed and the translatable drawer translated at least partially out a front opening of the fiber optic housing.
Figure 2B:
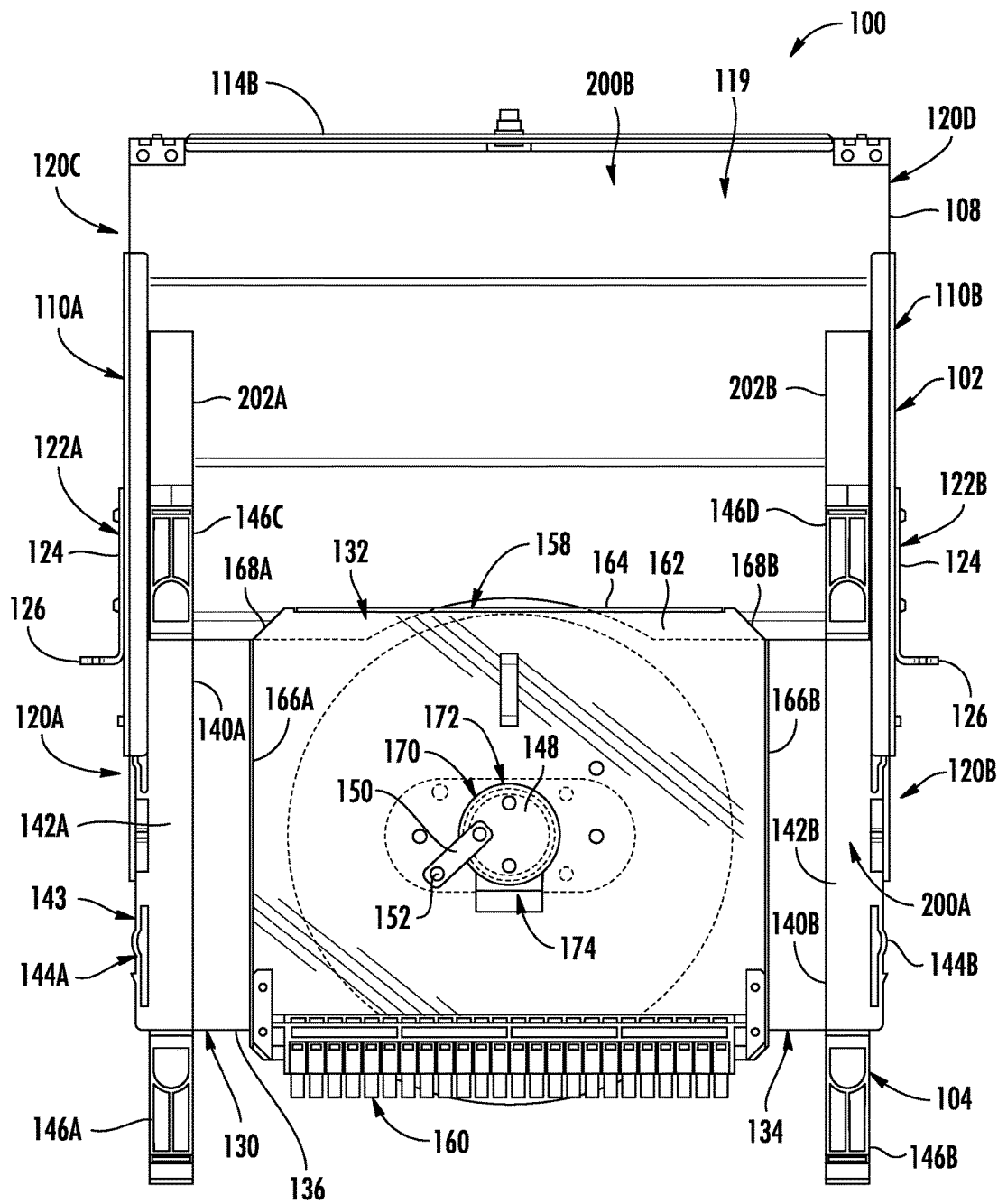
FIG. 2B is a top view of the fiber optic spool drawer of FIG. 2A.
Figure 2C:
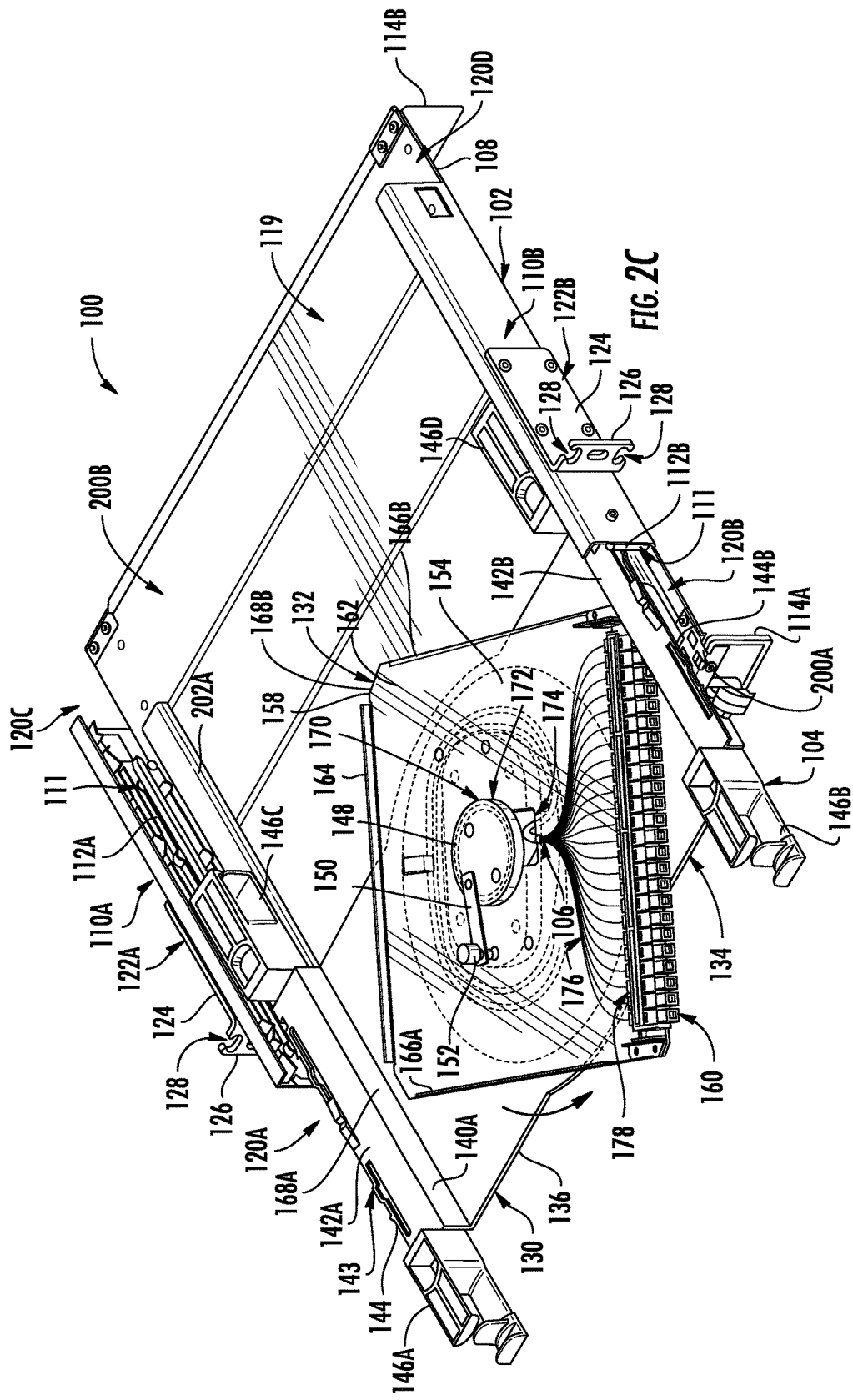
FIG. 2C is a top view of the fiber optic spool drawer of FIG. 2A comprising a partially deployed fiber optic cable, the rotatable spool partially rotated relative to the translatable drawer.

FIGS. 2A-2C are views of the fiber optic spool drawer 100 with the fiber optic deployment assembly 104 translated forward to a front extended position. FIG. 2A is a front perspective view of the interior the fiber optic spool drawer 100 with the translatable drawer 130 translated at least partially out of the front of the fiber optic housing 102, FIG. 2B is a top view of the interior of the fiber optic spool drawer 100, and FIG. 2C is a top view of the fiber optic spool drawer 100 with the fiber optic cable 106 partially deployed and the fiber optic deployment assembly 104 partially rotated.

Referring to FIGS. 2A-2B, the front hinged door 114A is in an open position (e.g., not upwardly vertical relative to the fiber optic housing base 108). Accordingly, the fiber optic housing 102 comprises a front opening 200A at least partially defined by the front edge of the fiber optic housing base 108 and/or the front edge of the top cover 116 (e.g., front edge of the top cover front panel 118A). The fiber optic deployment assembly 104 horizontally translates forward through the front opening 200A such that the front edge of the sliding tray base 136, the left and right front routing guides 146A, 146B, the front edge of the rotating tray base 162, and/or fiber optic adapters 160 extend past the front edge of the fiber optic housing base 108. This provides a user with greater access to the translatable drawer 130.

As shown, the fiber optic housing 102 comprises a left stabilizing rail 202A extending from a front to a back of the fiber optic housing 102 and disposed towards a left side thereof. The fiber optic housing 102 further comprises a right stabilizing rail 202B extending from a front to a back of the fiber optic housing 102 and disposed towards a right side thereof. The spacing and width of the left and right stabilizing rail 202A, 202B correspond to the spacing between and height of the sliding tray left and right vertical walls 140A, 140B. More specifically, the outside surface of the left and right vertical walls 140A, 140B are configured to be approximately the same size as (or slightly less than) the space between the inside surface of the left and right stabilizing rails 202A, 202B (with the left and right upper horizontal walls 142A, 142B extending over the left and right stabilizing rails 202A, 202B). As the fiber optic deployment assembly 104 is withdrawn through the front opening 200A, the left and right stabilizing rails 202A, 202B prevent twisting of the fiber optic deployment assembly 104 that may cause accidental dislocation of the fiber optic deployment assembly 104 from the left and right rail guides 112A, 112B of the fiber optic housing 102. Referring to FIG. 2C, the rotatable spool 132 rotates relative to the fiber optic housing 102 and translatable drawer 130 in the front extended position. When the rotatable spool 132 rotates and/or as the translatable drawer 130 translates, any torque (e.g., twisting) translated to the underlying fiber optic translatable drawer 130 is resisted by the left and right stabilizing rails 202A, 202B. This also prevents accidental dislocation of the fiber optic deployment assembly 104 from the left and right rail guides 112A, 112B of the fiber optic housing 102.

Figure 3A:
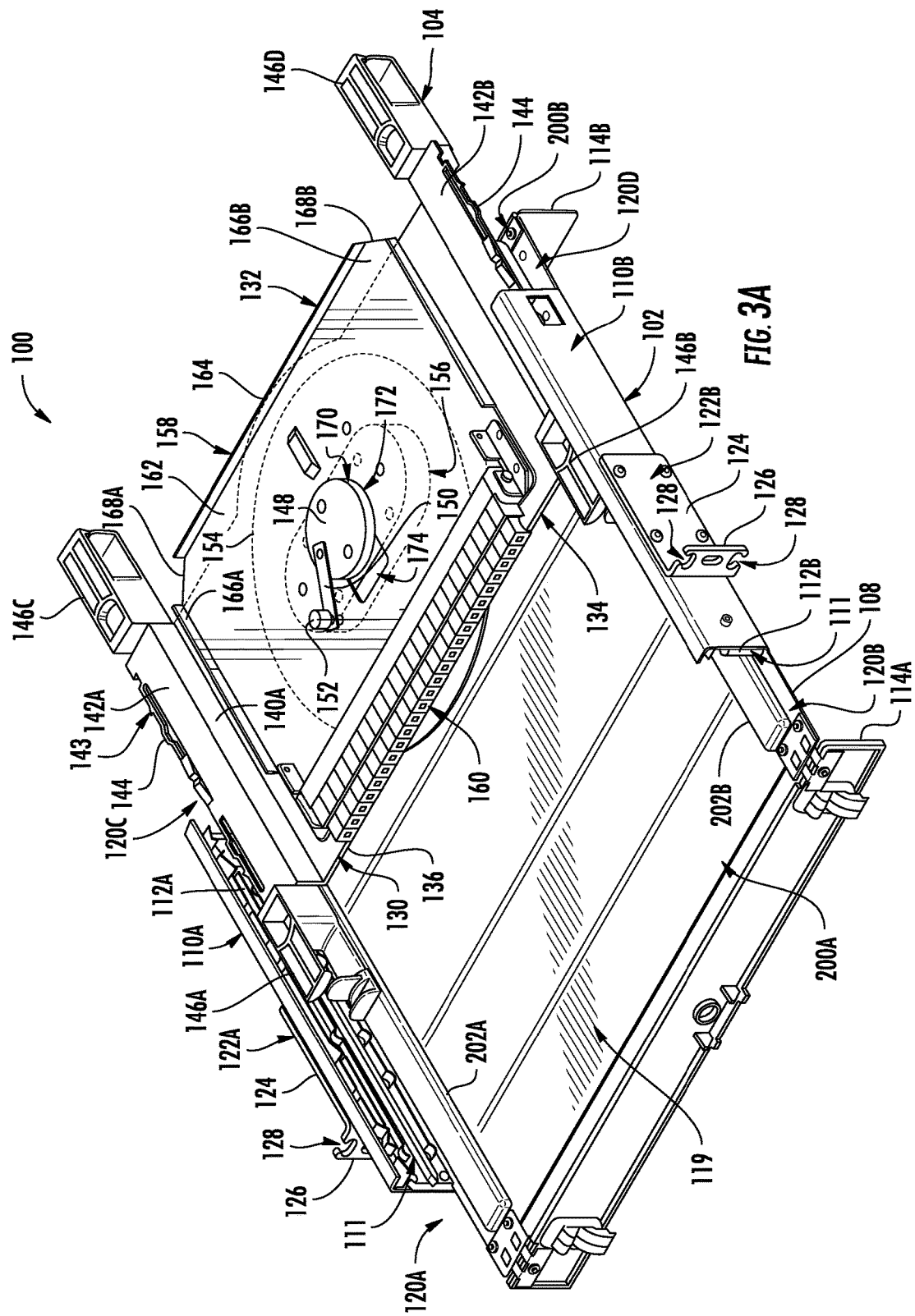
FIG. 3A is a front perspective view of the fiber optic spool drawer of FIGS. 1A-2C with the top cover removed and the translatable drawer translated at least partially out a front opening of the fiber optic housing.
Figure 3B:
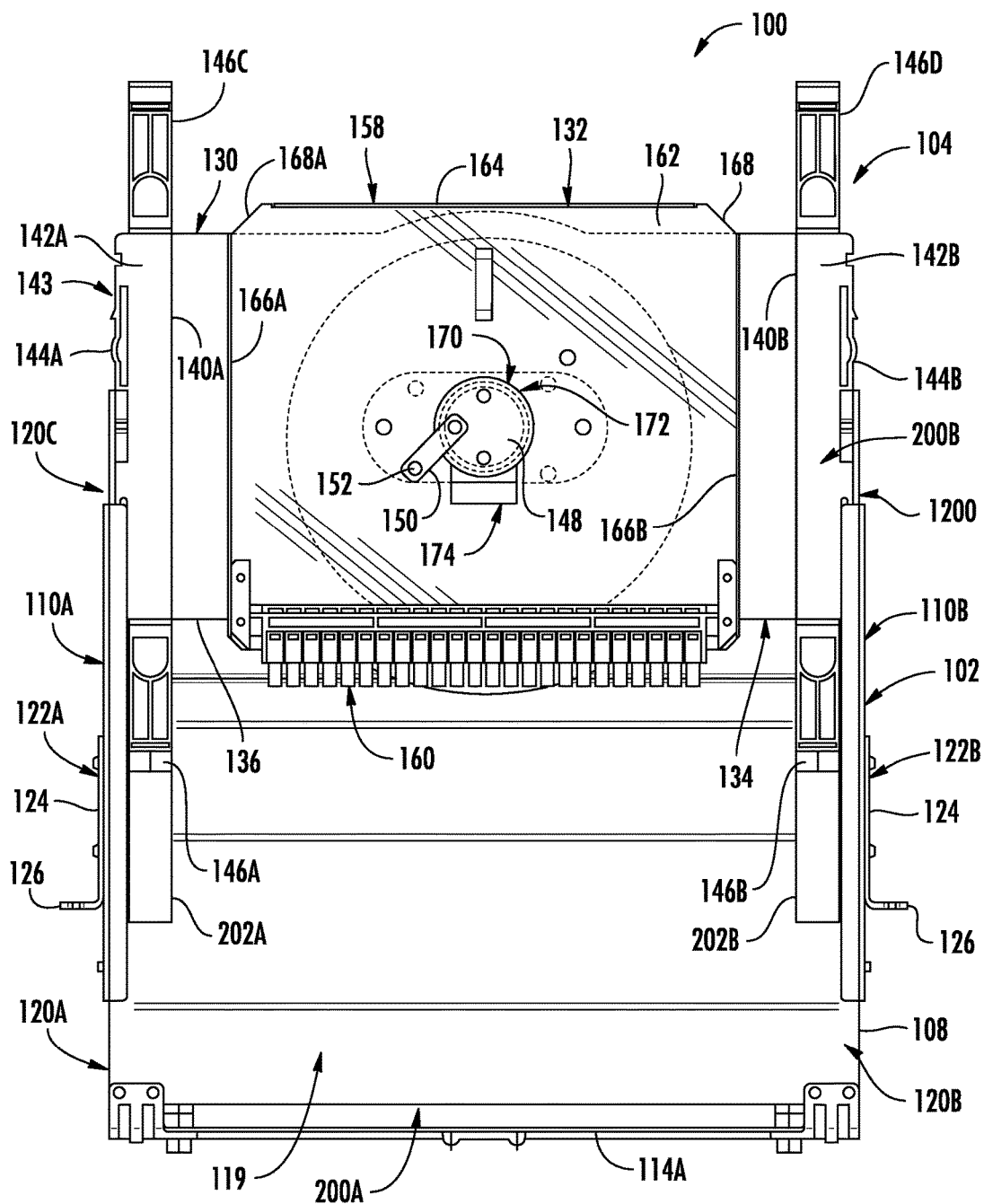
FIG. 3B is a top view of the fiber optic spool drawer of FIG. 3A.
Figure 3C:
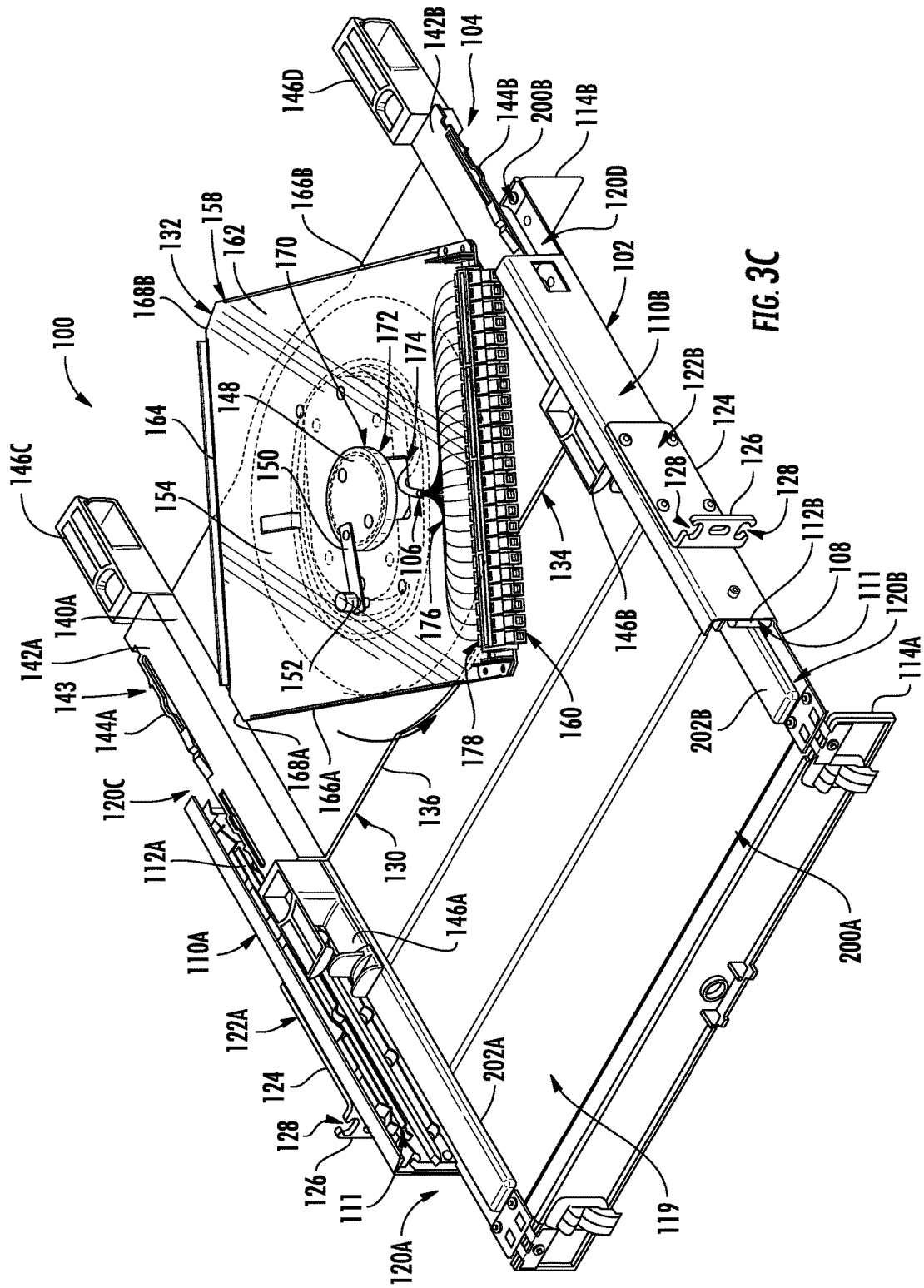
FIG. 3C is a top view of the fiber optic spool drawer of FIG. 3A comprising a partially deployed fiber optic cable, the rotatable spool partially rotated relative to the translatable drawer.

FIGS. 3A-3C are views of the fiber optic spool drawer 100 with the fiber optic deployment assembly 104 translated backward to a back extended position. FIG. 3A is a front perspective view of the interior of the fiber optic spool drawer 100 with the translatable drawer 130 translated at least partially out of the back of the fiber optic housing 102, FIG. 3B is a top view of the fiber optic spool drawer 100, and FIG. 3C is a top view of the fiber optic spool drawer 100 with the fiber optic cable 106 partially deployed and the fiber optic deployment assembly 104 partially rotated.

Referring to FIGS. 3A-3B, the back hinged door 114B is in an open position (e.g., not upwardly vertical relative to the fiber optic housing base 108). Accordingly, the fiber optic housing 102 comprises a back opening 200B at least partially defined by the back edge of the fiber optic housing base 108 and/or the back edge of the top cover 116 (e.g., back edge of the top cover back panel 118B). The fiber optic deployment assembly 104 horizontally translates backward through the back opening 200B such that the back edge of the sliding tray base 136, the left and right back routing guides 146C, 146D, the back edge of the rotating tray base 162, and/or fiber optic adapters 160 extend past the back edge of the fiber optic housing base 108. This provides a user with greater access to the translatable drawer 130.

As with the front extended position discussed above, the fiber optic deployment assembly 104 is withdrawn through the back opening 200B, the left and right stabilizing rails 202A, 202B prevent twisting of the fiber optic deployment assembly 104 that may cause accidental dislocation of the fiber optic deployment assembly 104 from the left and right rail guides 112A, 112B of the fiber optic housing 102. Referring to FIG. 3C, the rotatable spool 132 rotates relative to the fiber optic housing 102 and translatable drawer 130 in the back extended position. When the rotatable spool 132 rotates and/or the translatable drawer 130 translates, any torque (e.g., twisting) translated to the underlying fiber optic translatable drawer 130 is resisted by the left and right stabilizing rails 202A, 202B. This also prevents accidental dislocation of the fiber optic deployment assembly 104 from the left and right rail guides 112A, 112B of the fiber optic housing 102.

FIGS. 4A-4B are views of fiber optic cable 106 deployed from the fiber optic spool drawer 100 with the front and back hinged doors 114A, 114B in the closed position. More specifically, FIG. 4A is a top perspective view of the fiber optic housing 102 illustrating the fiber optic cable 106 deployed through a right front routing guide 146B when the front hinged door 114A is closed. The right front routing guide 146B retains the fiber optic cable 106 in position and maintains a minimum bend radius of the fiber optic cable 106. FIG. 4B is a top perspective view of the fiber optic housing 102 illustrating the fiber optic cable 106 deployed through a left back routing guide 146C when the back hinged door 114B is closed. The front and back routing guides 146A, 146B, 146C, 146D retain the fiber optic cable 106 in position and maintain a minimum bend radius of the fiber optic cable 106.

Figure 5A:
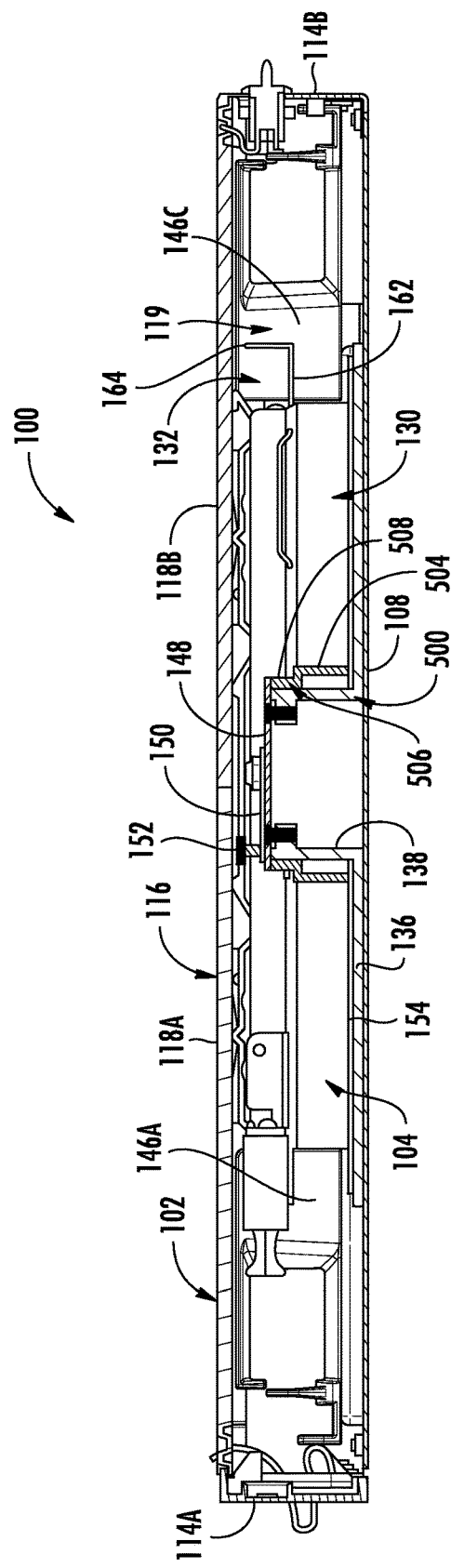
FIG. 5A is a cross-sectional side view of the fiber optic spool drawer of FIG. 1A illustrating assembly of the translatable drawer to the rotatable spool.

FIGS. 5A-5B are views illustrating the assembly of the fiber optic spool drawer 100. More specifically, FIG. 5A is a cross-sectional side view of the fiber optic housing 102 of FIG. 1A illustrating assembly of the translatable drawer 130 to the rotatable spool 132, and FIG. 5B is a perspective exploded view of the fiber optic housing 102 of FIGS. 1A-5A.

The rotatable spool base disk comprises a center hole 500 with a plurality of studs 502 extending from a top of the rotatable spool base disc 154 and circumferentially spaced around the base disc center hole 500 for mounting to the spindle 156. The spindle 156 comprises a base 504 having an oval or elongated periphery. Of course, the spindle base 504 could be other suitable shapes (e.g., circular). The curved periphery of the spindle 156 ensures that the fiber optic cable 106 wrapped around it does not exceed a minimum bend radius. The spindle base 504 defines a center hole 506 to receive the sliding tray mounting cylinder 138, and also comprises an upper rim 508 surrounding the center hole 506 for mounting to the rotating tray 158. A plurality of stud receptacles 510 are circumferentially positioned around the center hole 506 for mounting to the base disc studs 502. Further the spindle base 504 comprises two tray mount apertures 512 positioned at opposing ends of the spindle base 504 for mounting to the rotating tray 158. The spindle base 504 is mounted to the base disc 154 by aligning the spindle stud receptacles 510 with the base disc studs 502 and positioning fasteners therethrough.

The rotating tray 158 further comprises spindle mount apertures 514 positioned towards a left and right of the rotating tray 158 for mounting the rotating tray 158 to the spindle 156. The rotating tray 158 is mounted to the spindle 156 by aligning the spindle mount apertures 514 with the spindle tray mount apertures 512 and positioning fasteners therethrough. When assembled, the base disc center hole 500, the spindle center hole 506, and the rotating tray center aperture mounting portion 172 are all aligned with one another, and receive at least a portion of the sliding tray mounting cylinder 138 therein. Further the rotating tray center aperture mounting portion 172 may be configured to receive a portion of the spindle upper rim 508 therein. Further, the rotating tray 158 comprises a plurality of locking holes 516 configured to receive the translatable drawer locking mechanism 152. More specifically, the rotating tray could comprise a plurality of locking holes 516 disposed at opposite sides of the center aperture 170 (e.g., on a left side and right side) to provide multiple locking positions of the rotatable spool 132 relative to the translatable drawer 130.

As shown, the mounting cylinder 138 is hollow with two mounting cylinder receptacles 518 positioned at a top of the mounting cylinder 138 on an interior surface, and at opposite sides, thereof. The translatable drawer cover 148 further comprises two cover apertures 520 configured to align with the mounting cylinder receptacles 518 to receive a fastener to attach the cover 148 to the mounting cylinder 138. The mounting cylinder 138 has a smaller diameter than the cover 148 to retain the rotatable spool 132 between the sliding tray base 136 and the cover 148.

When the translatable drawer locking mechanism 152 is positioned within one of the plurality of rotating tray locking holes 516, the rotatable spool cannot rotate relative to the fiber optic housing 102 and the translatable drawer 130 because the cover 148 is fixedly attached to the sliding tray 134. To unlock the rotatable spool 132, the locking mechanism 152 is pulled up out of the locking hole 516 (which could be biased downward by a spring, or could be a screw and rotated up out of engagement with the locking hole 516). Once disengaged, the locking mechanism 152 can be rotated out of the way by the rotatable arm 150. This prevents accidental reengagement of the locking mechanism 152 as the rotatable spool 132 is rotated.

FIGS. 6A-6B are views of the rail guide of the fiber optic spool drawer 100 discussed above. More specifically, FIG. 6A is a cross-sectional side view of the fiber optic spool drawer 100 of FIG. 1A illustrating engagement of the fiber optic deployment assembly 104 with a left rail guide 112A of the fiber optic housing 102, and FIG. 6B is a side view of the left rail guide 112A of FIG. 6A. Although the fiber optic housing left sidewall 110A, the left rail guide 112A, the left side of the top cover front and back panels 118A, 118B are shown and described, the features described can also be provided on the fiber optic housing right sidewall 110B, the right rail guide 112B, and the right side of the top cover front and back panels 118A, 118B.

As shown, the fiber optic housing left sidewall 110A comprises an upper flange 600 extending inwardly from a top of the fiber optic housing left sidewall 110A, the upper flange 600 at least partly defining a left upper channel 602 to receive an edge of the top cover 116 to attach the top cover 116 to the fiber optic housing left and right sidewalls 110A, 110B. The fiber optic housing left sidewall 110A further comprises a plurality of leaf springs 604A, 604B. More specifically, the fiber optic housing left sidewall 110A comprises a front leaf spring 604A disposed towards a front of the fiber optic housing 102, and a back leaf spring 604B disposed towards a back of the fiber optic housing 102. The front and back leaf springs 604A, 604B at least partly defining a bottom part of the left upper channel 602 and are configured to engage and retain the fiber optic housing top cover 116. Each of the front leaf spring 604A and back leaf spring 604B comprise a protrusion 606A, 606B extending upwardly and being upwardly biased to engage the fiber optic housing top cover 116.

The top cover front panel 118A comprises at least one detent 608A (e.g., a left detent 608A at or proximate a left edge of the front panel 118A and a right detent at or proximate a right edge of the front panel 118A). Further, the top cover back panel 118B comprises at least one detent 608B (e.g., a left detent 608B at or proximate a left edge of the back panel 118B and a right detent at or proximate along a right edge of the back panel 118B). The detents 608A, 608B are complimentary in size and shape with the protrusion 606A, 606B of the front and back leaf springs 604A, 604B. In this way, the top cover front panel 118A is attached to the fiber optic housing left and right sidewalls 110A, 110B by inserting the front panel left edge into the left upper channel 602. As the front panel 118A is slid from the front into the left upper channel 602, the protrusion 606A of the front leaf spring 604A is pushed downwardly (e.g., as the width of the left edge of the front panel 118A is greater than the distance between the front leaf spring protrusion 606A and the left sidewall upper flange 600), until the protrusion 606A engages the front panel left detent 608A, thereby securing the front panel 118A within the left sidewall upper channel 602 and to the left sidewall 110A. The right edge of the front panel 118A is similarly secured to the fiber optic housing right sidewall 110B. Further, the back panel 118B is similarly secured to the fiber optic housing left sidewall 110A (e.g., by engagement of the left sidewall back leaf spring protrusion 606B with the back panel left detent 608B via the left sidewall upper channel 602) and the fiber optic housing right sidewall 110B.

The left and right rail guides 112A, 112B are configured to receive the fiber optic deployment assembly 104 (e.g., the sliding tray left and right engagement rails 144A, 144B). The left and right rail guides 112A, 112B allow the fiber optic deployment assembly 104 to be inserted into and pulled out from the fiber optic housing 102 (discussed in more detail below). The left and right rail guides 112A, 112B may be constructed out of any material desired, including but not limited to a polymer or metal. The left and right rail guides 112A, 112B are identical and include top and bottom mirror features for ease of manufacturing, and so that the left and right rail guides 112A, 112B can be mounted on either the fiber optic housing left sidewall 110A or the fiber optic housing right sidewall 110B.

The left rail guide 112A comprises a panel 610 with a plurality of mounting holes 612 to mount the left rail guide 112A to the fiber optic housing left sidewall 110A. The left rail guide 112A comprises a top rail 614A, a bottom rail 614B, and a center rail 616 therebetween. The top rail 614A and center rail 616 define a top channel 618A therebetween, and the bottom rail 614B and center rail 616 define a bottom channel 618B therebetween. The top and bottom channels 618A, 618B are configured so that one of them receives the sliding tray left or right engagement rails 144A, 144B.

The top rail 614A comprises a front leaf spring 620 disposed towards a front of the left rail guide 112A, the front leaf spring 620 comprising a protrusion 622 extending towards and biased towards the center rail 616. The front leaf spring 620 engages the translatable drawer 130 at a front position. The top rail 614A further comprises a back portion 624 disposed towards a back of the left rail guide 112A for engaging the translatable drawer 130 at a back position. The top rail 614A further comprises a center leaf spring 626 positioned between the front leaf spring 620 and the back portion 624. The center leaf spring 626 comprises a protrusion 628 extending towards and biased towards the center rail 616. The center leaf spring 626 engages the translatable drawer 130 in a center position. The bottom rail 614B comprises the same features as the top rail 614A (e.g., with a front leaf spring protrusion 622 extending towards and biased towards the center rail 616, and with a center leaf spring 626 extending towards and biased towards the center rail 616). The left rail guide 112A further comprises a front aperture 630A positioned in the top channel 618A towards a front of the left rail guide 112A. A front stopping member 632A comprises a surface at a front of the front aperture 630A for selectively locking the translatable drawer 130 within the left rail guide 112A. The left rail guide 112A further comprises a back aperture 630B positioned in the top channel 618A towards a back of the left rail guide 112A. A back stopping member 632B comprising a surface at a back of the back aperture 630B for selectively locking the translatable drawer 130 within the left rail guide 112A Further, the sliding tray left engagement rail 144A comprises a center engagement mechanism 634 for engaging the left rail guide 112A center leaf spring 626. The center engagement mechanism comprises a front angled surface 636A, a back angled surface 636B, and a detent 638 therebetween. As shown, when the fiber optic deployment assembly 104 is positioned within the fiber optic housing 102, the left rail guide top rail center leaf spring protrusion 628 engages the left engagement rail center engagement mechanism detent 638. Front and back angled surfaces 636A, 636B are angled upwardly toward the detent 638, thereby increasing the depth of the detent 638 and the force of engagement of the sliding tray 134 with the fiber optic housing 102.

The leaf springs discussed above provide stopping positions for the fiber optic deployment assembly 104 relative to the fiber optic housing 102 during translation of the fiber optic deployment assembly 104. Stopping positions allow the requirement of a technician to impart a certain force to pull or push the fiber optic deployment assembly 104 so that the fiber optic deployment assembly 104 is retained in place when not pulled or pushed. However, the force can also be designed to allow a technician to easily push in or pull out the fiber optic deployment assembly 104 when desired. Thus, the stopping or resting positions provided by the engagement of the leaf spring protrusions 622, 628 with the left engagement rail center engagement mechanism detent 638 are provided to require force to overcome the stopping position to translate the fiber optic deployment assembly 104.

When the fiber optic deployment assembly 104 is in a stopped position, the leaf spring protrusions 622, 628 are engaged with the left engagement rail center engagement mechanism detent 638, which are designed cooperatively such that the detent 638 does not impart a force on the leaf spring protrusions 622, 628. Thus, the front and center leaf springs 620, 626 are in an unstressed state when the fiber optic deployment assembly 104 is in a stopped position. This may be advantageous if the front and center leaf springs 620, 626 are made out of a material, such as a polymer material for example, where creep can occur over time, thus reducing the effectiveness of the leaf spring over time. However, this feature is not a requirement for the design. Each leaf spring 620, 626 may be designed to require approximately two pounds (lbs.) of pulling force to allow the leaf spring protrusion to overcome the sliding tray detent for a total of four lbs. pulling force (i.e., two detents in the tray rails are engaged with two protrusions disposed in two leaf springs). The pulling force required to overcome the engagement of the protrusion 622, 628 in the detent 638 could be designed to be any pulling force desired. For example, the pulling force required to overcome the engagement of the protrusion 622, 628 in the detent 638 could be designed to be greater than the pulling force required to engage or disengage a fiber optic connector 178 from a fiber optic spool drawer 100. The leaf springs 620, 626 in this embodiment are designed to each provide the same force, but such does not have to be the case. Further, the left and right rail guides 112A, 112B could be designed to provide fewer stopping positions or only provide that one protrusion 622, 628 is engaged with one detent in each stopping or resting position.

Figure 7A:
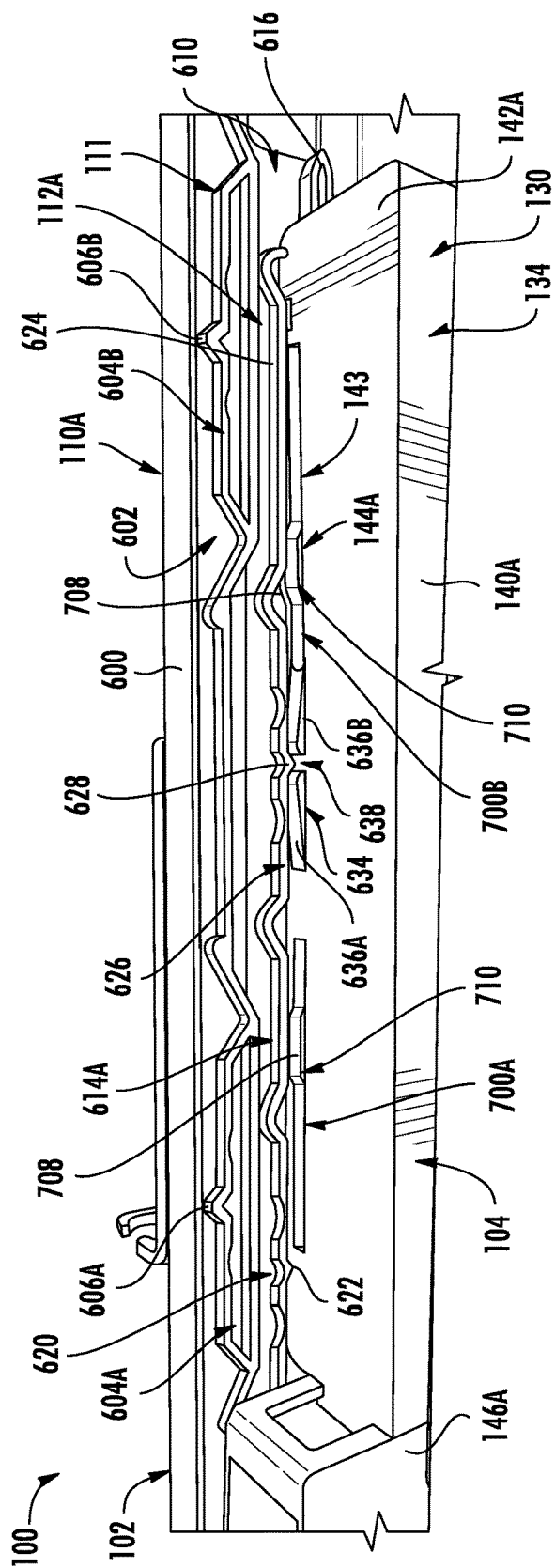
FIG. 7A is a perspective view of the fiber optic spool drawer of FIGS. 1A-6B illustrating the translatable drawer engaged with a center leaf spring of the left rail guide in a retracted position.

FIGS. 7A-7F are views of the fiber optic housing of FIGS. 1A-6B illustrating withdrawal of the fiber optic deployment assembly 104 from the fiber optic housing 102. More specifically, FIG. 7A is a perspective view of the fiber optic spool drawer 100 illustrating the sliding tray 134 engaged with the left rail guide top rail center leaf spring protrusion 628 when the fiber optic deployment assembly 104 is in the retracted position. As shown, the sliding tray left engagement rail 144A further comprises a front locking mechanism 700A towards a front of the left engagement rail 144A, and a back locking mechanism 700B towards a back of the left engagement rail 144A, with the center engagement mechanism 634 positioned therebetween.

Figure 7B:
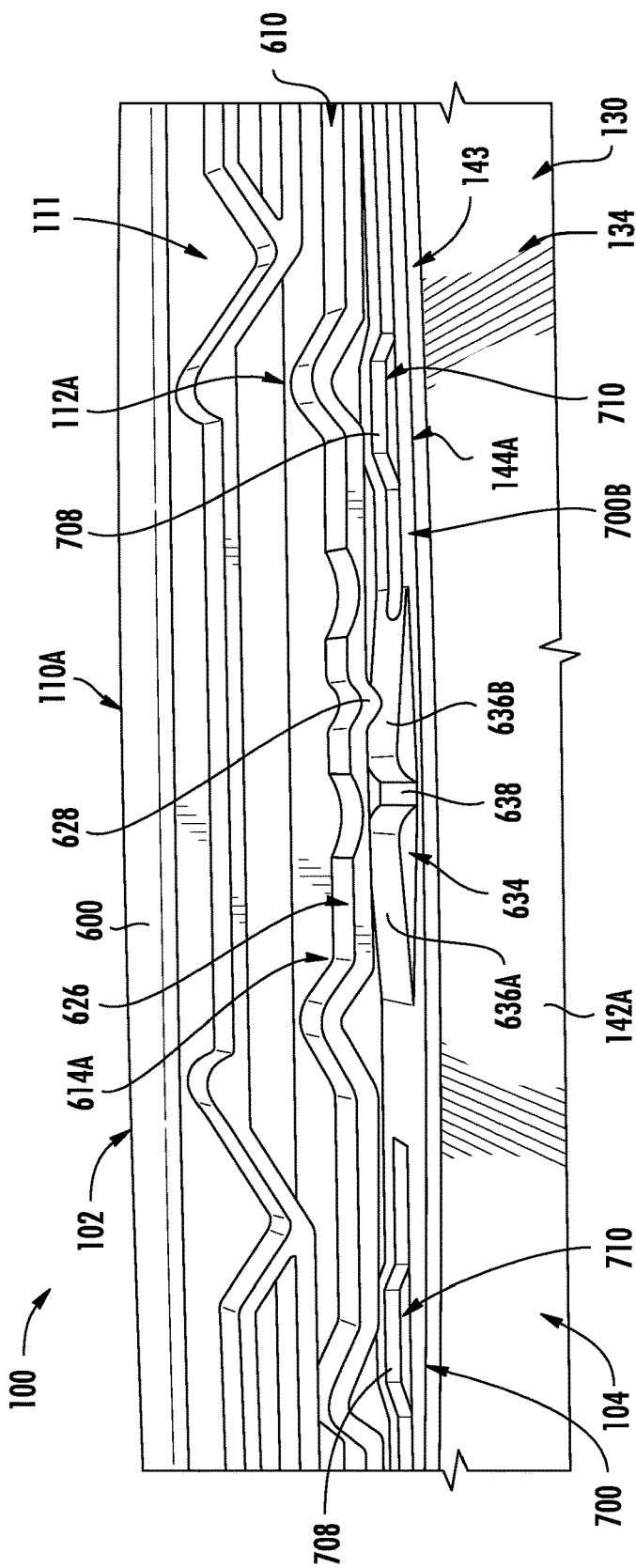
FIG. 7B is a perspective view of the fiber optic spool drawer of FIG. 7A illustrating the translatable drawer disengaging from the center leaf spring of the left rail guide as the translatable drawer is translated out the front opening of the fiber optic housing.

FIG. 7B is a perspective view of the fiber optic spool drawer 100 illustrating the fiber optic deployment assembly 104 disengaging from the rail guide center leaf spring 626 as the fiber optic deployment assembly 104 is translated out the front opening 200A of the fiber optic housing 102. More specifically, as the fiber optic deployment assembly 104 is translated forward, the left rail guide center leaf spring protrusion 628 is pushed upward and disengages the left engagement rail center engagement mechanism detent 638 and moves along the back angled surface 636B.

Figure 7C:
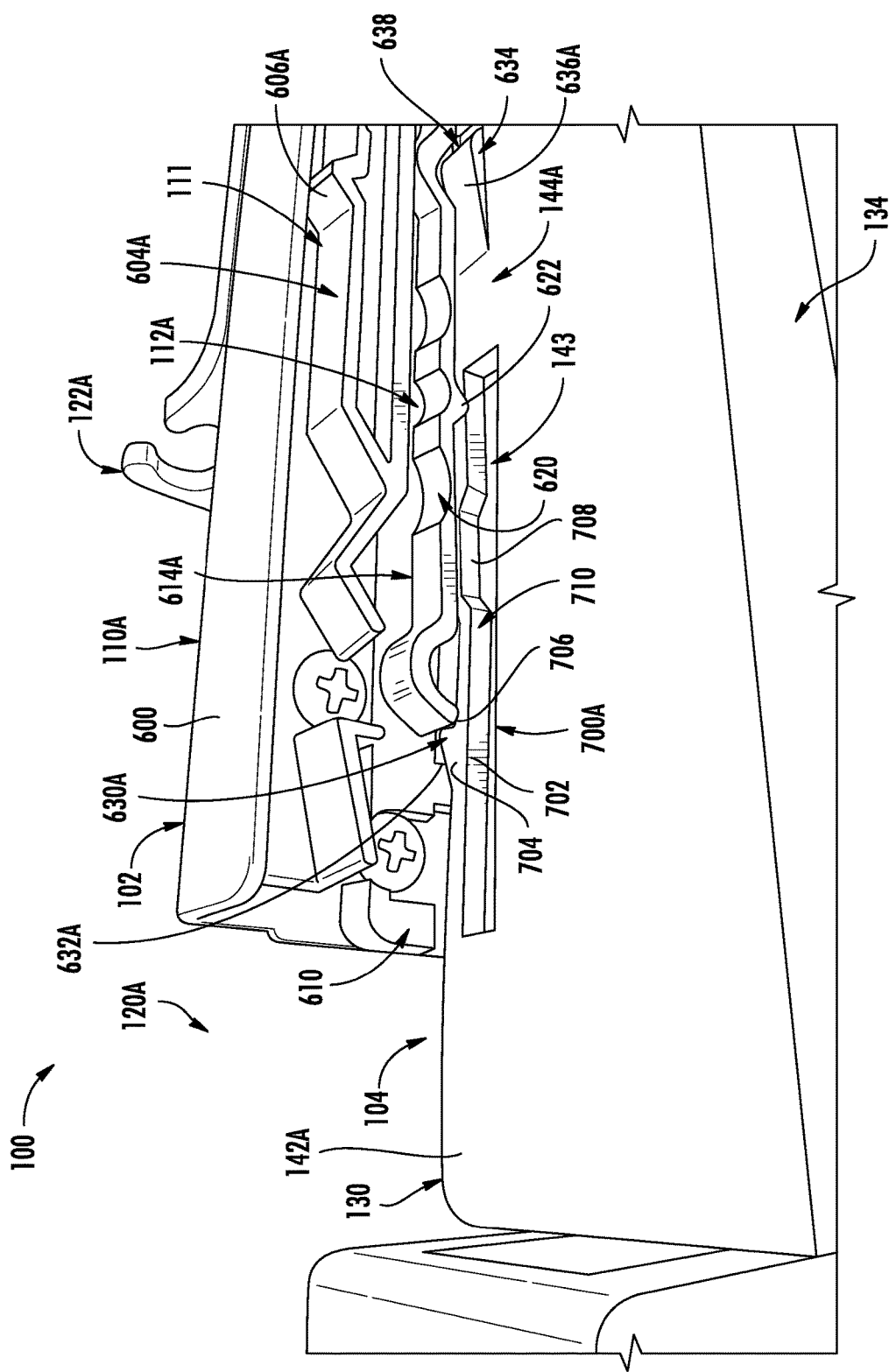
FIG. 7C is a perspective view of the fiber optic spool drawer of FIG. 7A illustrating a front engagement mechanism of a right rail of the translatable drawer interacting with the left rail guide as the translatable drawer is translated out the front opening of the fiber optic housing.

FIG. 7C is a perspective view of the fiber optic spool drawer 100 illustrating a front locking mechanism 700A interacting with the left rail guide 112A as the fiber optic deployment assembly 104 is further translated out the front opening 200A of the fiber optic housing 102. As shown, the front locking mechanism 700A is outwardly biased and comprises an outwardly biased movable triangular stop 702 (e.g., outwardly biased movable stop) extending outwardly and disposed towards a front of the fiber optic deployment assembly 104 to selectively lock the fiber optic deployment assembly 104 within the fiber optic housing 102. The triangular stop 702 comprises an angled surface 704 sloping outwardly from the front to the back for not engaging the stopping member 632A, 632B (depending on the direction of translation of the fiber optic deployment assembly 104), with a stopping surface 706 extending perpendicularly from an outer edge of the left engagement rail 144A for engaging the stopping member 632A, 632B. A bump 708 extends outwardly and is disposed towards a back of the fiber optic deployment assembly 104 (e.g., positioned between the triangular stop 702 and the center engagement mechanism 634 for a user to depress to selectively disengage the locking mechanism 700A, 700B from the left and right rail guides 112A, 112B. A groove 710 is defined proximate and inwardly from the triangular stop 702 and bump 708 (e.g., with the triangular stop 702 extending at least from the triangular stop 702 to the bump 708) to allow depression or compression of the bump 708 and locking mechanism 700A, 700B to an inwardly compressed position to disengage the locking mechanism 700A, 700B. As shown, as the fiber optic deployment assembly 104 is translated forward, the front locking mechanism angled surface 704 engages the front stopping member 632A, compressing the triangular stop 702 inward (e.g., decreasing thickness of the groove 710), until the stopping surface 706 is translated past the front stopping member 632A.

FIG. 7D is a perspective view of the fiber optic spool drawer 100 illustrating a back locking mechanism 700B of the translatable drawer 130 interacting with the left rail guide 112A as the fiber optic deployment assembly 104 is translated out the front opening 200A of the fiber optic housing 102. As shown, the fiber optic deployment assembly 104 is translated out the front opening 200A such that the front locking mechanism 700A and center engagement mechanism 634 are translated past the front stopping member 632A. Similar to the front locking mechanism 700A, the back locking mechanism 700B comprises a triangular stop 702 having an angled surface 704 and a stopping surface 706. Further, the front locking mechanism 700A comprises a bump 708 and groove 710. As the back locking mechanism bump 708 engages the front stopping member 632A, the bump 708 is compressed inward (e.g., decreasing thickness of the groove 710), until the bump 708 is translated past the front stopping member 632A.

Figure 7E:
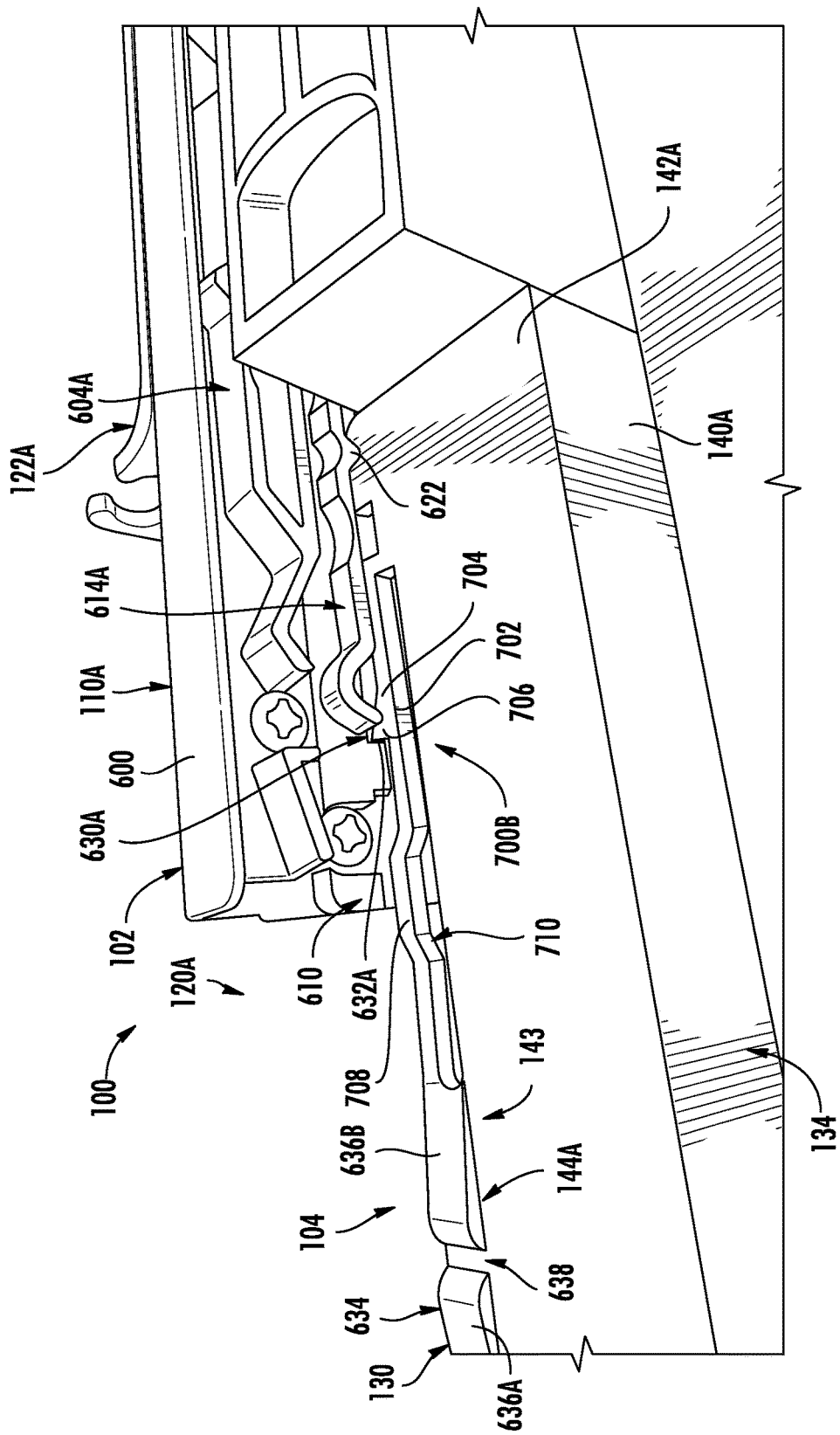
FIG. 7E is a perspective view of the fiber optic spool drawer of FIG. 7A illustrating locking engagement of the back engagement mechanism with the left rail guide.

FIG. 7E is a perspective view of the fiber optic spool drawer 100 illustrating locking engagement of the back locking mechanism 700B with the left rail guide 112A. As shown, the angled surface 704 of the back locking mechanism 700B contacts and engages the front stopping member 632A, thereby locking the fiber optic deployment assembly 104 within the fiber optic housing 102.

Figure 7F:
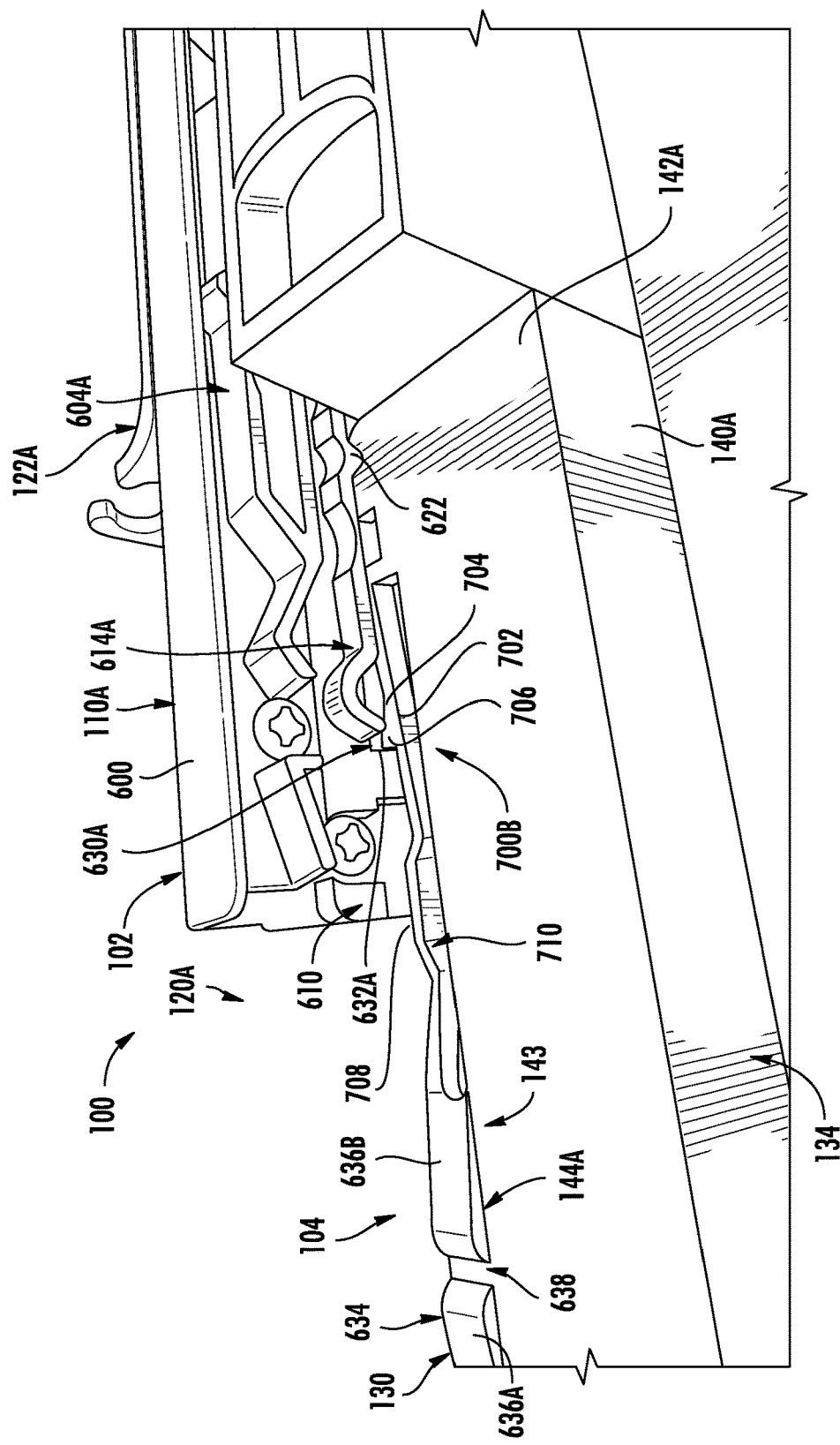
FIG. 7F is a perspective view of the fiber optic spool drawer of FIG. 7A illustrating selective disengagement of the back engagement mechanism with the left rail guide, thereby allowing removal of the translatable drawer from the fiber optic housing.

FIG. 7F is a perspective view of the fiber optic spool drawer 100 illustrating selective disengagement of the back locking mechanism 700B with the left rail guide 112A, thereby allowing removal of the fiber optic deployment assembly 104 from the fiber optic housing 102. As shown, a user selectively disengages the back locking mechanism 700B from the left rail guide 112A by pushing on the bump 708, thereby moving the triangular stop 702 inward (decreasing the width of the groove 710) until the triangular stop 702 horizontally clears the front stopping member 632A. Once cleared, the triangular stop 702 can be translated forward, past the front stopping member 632A.

Figure 8A:
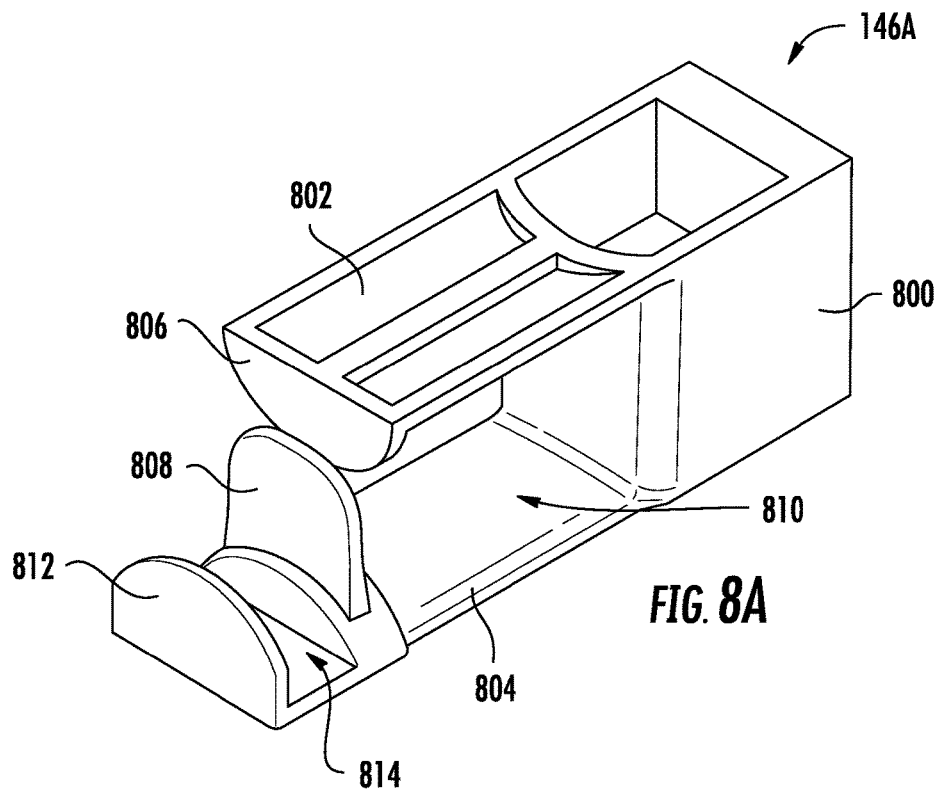
FIG. 8A is a perspective view of the routing guide of FIGS. 1A-5B.
Figure 8B:
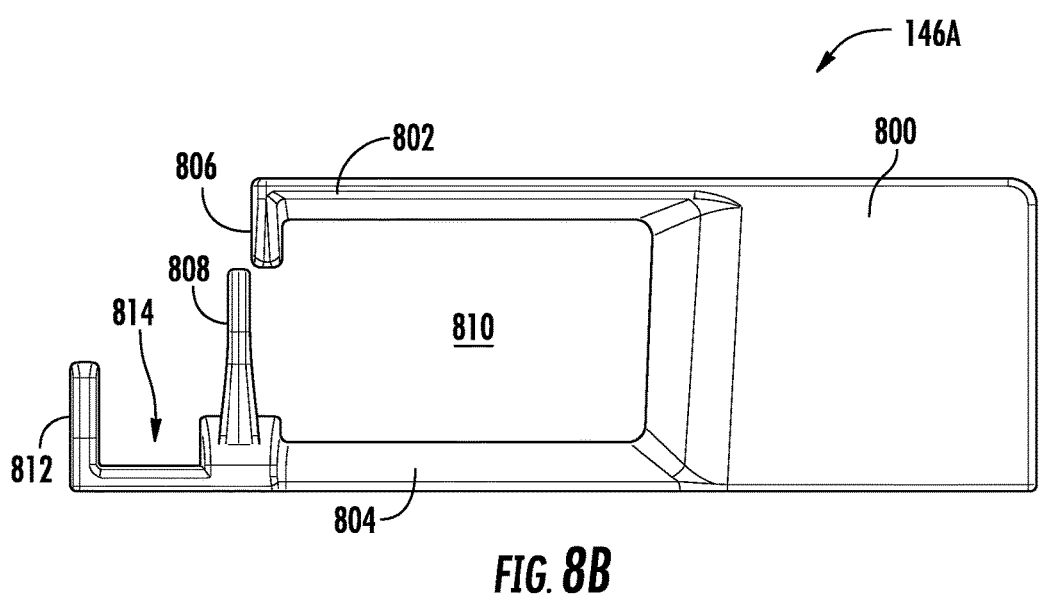
FIG. 8B is a side view of the routing guide of FIG. 8A.

FIGS. 8A-8B are views of the routing guide 146A of the fiber optic spool drawer 100. The front and back routing guides 146A, 146B, 146C, 146D are of the same configuration. The routing guide 146A is comprised of a routing guide body 800. A top extension member 802 extends from a top of the routing guide body 800, and a bottom extension member 804 extends from a bottom of the routing guide body 800. The top extension member 802 and bottom extension member 804 extend in the same direction. Further the top extension member 802 comprises an end wall 806 extending downwardly, and the bottom extension member 804 comprises an end wall 808 extending upwardly. The end walls 806, 808 extend towards each other approximately the same distance from the routing guide body 800, thereby defining a retention area 810 to retain a portion of the fiber optic cable 106 therein. Further, in some embodiments, the bottom extension member end wall 808 is taller and offset from the top extension member end wall 806 (e.g., positioned farther from the routing guide body 800). This offset creates an opening to feed a portion of the fiber optic cable 106 into the retention area 810. Further, the increased height of the bottom extension member end wall 808 prevents accidental dislocation of the fiber optic cable 106 from the retention area 810. As shown, curved inner surfaces of the top and bottom extension members 802, 804 and the routing guide body 800 defining the retention area 810 have softened edges (e.g., curved, chamfered, etc.). This prevents damage to the fiber optic cable 106 and maintains a minimum bend radius as the fiber optic cable 106 is withdrawn from the fiber optic deployment assembly 104 and/or deployed and resting within the routing guide 146A. The bottom extension member 804 may further comprise an upwardly extending engagement wall 812, with an engagement area 814 defined between the bottom extension member end wall 808, the bottom extension member 804, and the bottom extension member engagement wall 812. This provides finger access and a surface for a finger of a user to pull the fiber optic deployment assembly 104 out of the fiber optic housing 102 (not shown).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic spool drawer, comprising:
a housing defining a front opening, a back opening, and an interior area disposed between the front opening and the back opening, the housing comprising a guide system disposed in the interior area;
a translatable drawer configured to be housed within the interior area of the housing, the translatable drawer comprising:
a rail system configured to slidably engage with the guide system to allow the translatable drawer to translate through the front opening and back opening of the housing; and
at least one locking mechanism configured to maintain engagement of the rail system with the guide system until selective disengagement therefrom, the translatable drawer removable through the front opening and the back opening by selective disengagement of the at least one locking mechanism from the guide system; and
a rotatable spool rotatably mounted to the translatable drawer, the rotatable spool configured to store a length of a fiber optic cable wound around the rotatable spool, the fiber optic cable comprising a plurality of optical fibers terminated by a plurality of connectors.

2. The fiber optic spool drawer of claim 1, wherein the housing further comprises a front hinged door selectively positionable in the front opening, and a back hinged door selectively positionable in the back opening.

3. The fiber optic spool drawer of claim 1, further comprising at least one mounting bracket with a bottom slot and a top slot attached to an exterior of the housing for mounting the fiber optic spool drawer.

4. The fiber optic spool drawer of claim 1, wherein the translatable drawer further comprises a front routing guide fixedly positioned at a front of the translatable drawer and a back routing guide fixedly positioned at a back of the translatable drawer, wherein the front routing guide is configured to receive at least a portion of the fiber optic cable therethrough to maintain a minimum bend radius of the fiber optic cable when the fiber optic cable is deployed from a front of the housing, and wherein the back routing guide is configured to receive at least a portion of the fiber optic cable therethrough to maintain the minimum bend radius of the fiber optic cable when the fiber optic cable is deployed from a back of the housing.

5. The fiber optic spool drawer of claim 1, wherein:
the translatable drawer comprises a sliding tray,
the rail system comprises an engagement rail disposed at an end of the sliding tray, and
the engagement rail comprises the at least one locking mechanism.

6. The fiber optic spool drawer of claim 1, wherein the at least one locking mechanism comprises an outwardly biased movable stop.

7. The fiber optic spool drawer of claim 6, wherein the guide system comprises a stopping member, the stopping member configured to engage the outwardly biased movable stop when the translatable drawer is translated out from the housing and the outwardly biased movable stop is in a resting position, and the stopping member is configured to not engage the outwardly biased movable stop when the translatable drawer is translated out from the housing and the outwardly biased movable stop is in an inwardly compressed position.

8. The fiber optic spool drawer of claim 1, wherein the guide system comprises a front stopping member to prevent the translatable drawer from being removed from the back of the housing, and a back stopping member configured to prevent the translatable drawer from being removed from the front of the housing.

9. The fiber optic spool drawer of claim 1, wherein the guide system comprises a plurality of leaf springs, each of the plurality of leaf springs configured to engage the translatable drawer at different translatable positions of the translatable drawer relative to the housing.

10. The fiber optic spool drawer of claim 1, further comprising a fiber optic adapter fixedly attached to the rotatable spool, the fiber optic adapter configured to engage the plurality of connectors of the fiber optic cable.

11. The fiber optic spool drawer of claim 1, wherein the rotatable spool comprises an at least partially translucent rotating tray configured to provide visibility to the fiber optic cable wound around the rotatable spool beneath the rotating tray.

12. The fiber optic spool drawer of claim 1, wherein the rotatable spool is configured to rotate when the translatable drawer is in a retracted position within the housing.

* * * * *